United States Patent
Hasegawa et al.

(10) Patent No.: US 6,941,206 B2
(45) Date of Patent: Sep. 6, 2005

(54) TIP-OVER DETECTION DEVICE FOR MOTOR VEHICLE

(75) Inventors: Takahiko Hasegawa, Shizuoka (JP); Masashi Kataoka, Shizuoka (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 144 days.

(21) Appl. No.: 10/278,764

(22) Filed: Oct. 21, 2002

(65) Prior Publication Data

US 2003/0132837 A1 Jul. 17, 2003

(30) Foreign Application Priority Data

| Oct. 19, 2001 | (JP) | 2001-321497 |
| Oct. 29, 2001 | (JP) | 2001-330158 |
| Jul. 12, 2002 | (JP) | 2002-204267 |
| Sep. 19, 2002 | (JP) | 2002-273003 |

(51) Int. Cl.$^7$ .................................... G06F 7/00
(52) U.S. Cl. ................. 701/38; 701/46; 701/70; 280/755; 73/504.03; 340/440; 180/282
(58) Field of Search ............... 701/70, 71, 37, 701/38, 39, 46, 48; 280/735, 755; 73/504.03; 340/440, 427, 467, 459; 180/282

(56) References Cited

U.S. PATENT DOCUMENTS 3,034,097 A  5/1962 English et al. .......... 340/440
3,772,643 A  11/1973 Dodd et al. .......... 340/440
3,807,423 A  4/1974 Engel .................. 137/38

(Continued)

FOREIGN PATENT DOCUMENTS

| DE | 31 03 354 A1 | 11/1982 |
| DE | 35 42 353 A 1 | 6/1987 |
| DE | 195 32 521 A 1 | 3/1997 |
| DE | 19723 069 C1 | 10/1998 |
| DE | 198 21 134 A 1 | 12/1999 |
| EP | 1 170 181 A2 | 1/2002 |
| JP | 09207706 | 8/1997 |
| JP | 2002-71703 | 3/2002 |
| WO | WO 01/28820 A2 | 4/2001 |

Primary Examiner—Thomas G. Black
Assistant Examiner—Arthur D. Donnelly
(74) Attorney, Agent, or Firm—Knobbe, Martens, Olson & Bear LLP

(57) ABSTRACT

A vehicle includes a tip over detection device that uses a vertically oriented sensor to improve the accuracy of detecting when the vehicle has tipped over. An ECU communicates with the accelerometer and controls engine operation. The ECU stops the engine, preferably gradually, when the vehicle has tipped over. The sensor can also detect lean in additional directions that are orthogonal to the vertical direction.

18 Claims, 18 Drawing Sheets

U.S. PATENT DOCUMENTS

| | | | |
|---|---|---|---|
| 3,840,036 A | 10/1974 | Renk | 137/38 |
| 3,882,957 A | 5/1975 | Fritz | 180/284 |
| 3,915,255 A | 10/1975 | Springer | 180/28 |
| 4,005,724 A | 2/1977 | Courtot | 137/38 |
| 4,275,753 A | 6/1981 | Williams | 137/45 |
| 4,322,714 A | 3/1982 | Morgan | 340/427 |
| 4,390,759 A | 6/1983 | Scieur | 200/52 A |
| 4,447,801 A | 5/1984 | Masuda | 340/459 |
| 4,453,778 A | 6/1984 | Smith et al. | 303/22.7 |
| 4,583,612 A | 4/1986 | Parker | 180/227 |
| 4,624,140 A | 11/1986 | Ekchian et al. | 73/304 C |
| 4,633,831 A | 1/1987 | Ohkumo | 123/325 |
| 4,664,080 A | 5/1987 | Minks | 123/325 |
| 4,796,716 A | 1/1989 | Masuda | 180/176 |
| 4,848,502 A | 7/1989 | Kikuta et al. | 180/179 |
| 4,856,613 A | 8/1989 | Reginold | 180/282 |
| 5,033,428 A | 7/1991 | Sasaki | 123/198 D |
| 5,319,557 A | 6/1994 | Juman | 701/97 |
| 5,382,049 A | 1/1995 | Hiramitsu et al. | 280/735 |
| 5,445,443 A | 8/1995 | Hauser et al. | 303/137 |
| 5,602,371 A | 2/1997 | Kerns et al. | 200/61.47 |
| 5,613,571 A | 3/1997 | Rank et al. | 180/282 |
| 5,758,301 A | 5/1998 | Saito et al. | 701/45 |
| 5,825,098 A | 10/1998 | Darby et al. | 307/10.1 |
| 5,835,873 A | 11/1998 | Darby et al. | 701/45 |
| 5,955,714 A | 9/1999 | Reneau | 200/61.52 |
| 6,038,495 A | 3/2000 | Schiffmann | 701/1 |
| 6,192,305 B1 | 2/2001 | Schiffmann | 701/45 |
| 6,417,767 B1 | 7/2002 | Carlson et al. | 340/467 |
| 6,428,118 B1 | 8/2002 | Blosch | 303/9.64 |
| 6,483,201 B1 | 11/2002 | Klarer | 307/10.6 |
| 6,536,401 B2 | 3/2003 | McConnell | 123/198 D |
| 6,584,388 B2 * | 6/2003 | Schubert et al. | 701/46 |
| 6,631,317 B2 * | 10/2003 | Lu et al. | 701/45 |
| 2002/0039951 A1 | 4/2002 | Hasegawa | 477/183 |

\* cited by examiner

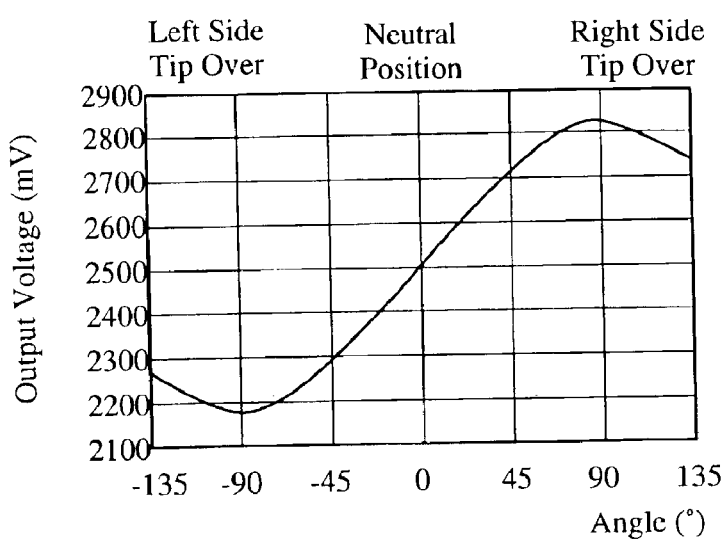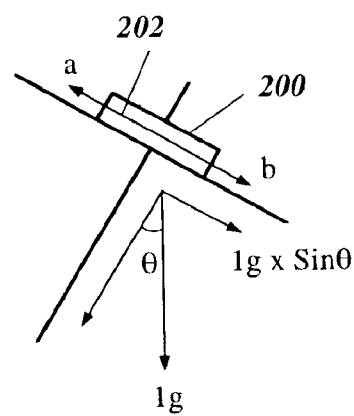
Figure 5(A)                    Figure 5(B)

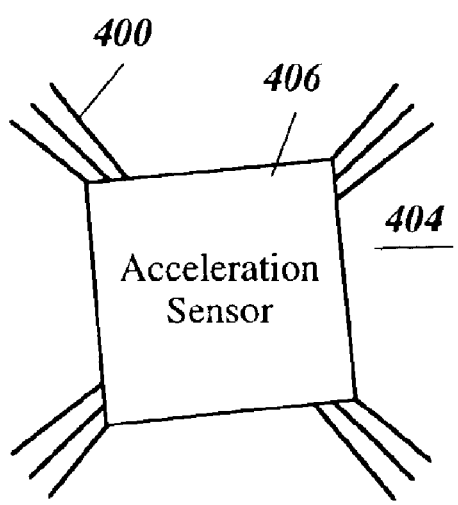 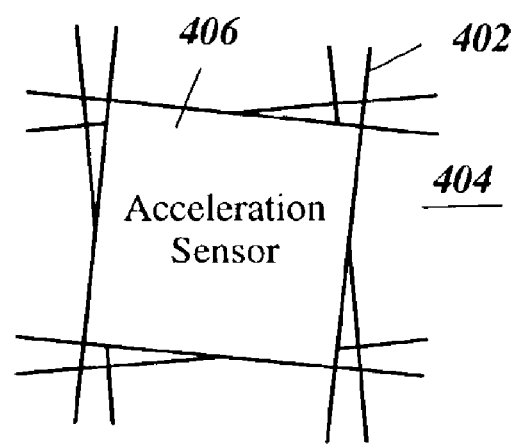
Figure 12 (A)     Figure 12 (B)

TIP-OVER DETECTION DEVICE FOR MOTOR VEHICLE

RELATED APPLICATIONS

The present application is based on and claims priority under 35 U.S.C. §119 to Japanese Patent Application Nos. 2001-321497 (field on Oct. 19, 2001), 2001-330158 (filed on Oct. 29, 2001), 2002-204267 (filed on Jul. 12, 2002), and 2002-273003 (filed on Sep. 19, 2002), the disclosures of which are hereby incorporated by reference in their entirety.

BACKGROUND OF THE INVENTION

1. Field of the Invention

The present invention generally relates to a tip over detection device for a motor vehicle. More particularly, the present invention relates to a tip over detection device using an accelerometer to detect when a motor vehicle excessively leans or lays down.

2. Description of the Related Art

Motorcycles generally comprise a frame with a steerable front wheel and a driven rear wheel. An engine is mounted within the frame between the front wheel and the rear wheel. The engine generally comprises at least one piston that reciprocates within a bore formed in the cylinder block. A cylinder head, together with the cylinder bore and the piston, defines a combustion chamber in which an air-fuel mixture is compressed and ignited. A throttle valve may be provided to control the air flow rate into the combustion chamber and a fuel injection system may be provided to control the amount of fuel mixed with the air. An ignition system, including a spark plug, ignites the air-fuel mixture that is compressed within the combustion chamber by the piston. Ignition and burning of the air-fuel mixture drives the piston downward within the cylinder bore. A connecting rod transfers the reciprocating linear movement of the piston to a rotatable crankshaft.

A controller, such as an electronic control unit ("ECU"), communicates with various engine and motorcycle components. The ECU, in particular, generally controls timing of the ignition system and injection of the fuel injection system based upon data received from various sensors. For instance, in some motorcycles, the ECU receives information regarding the engine speed from an engine speed sensor, the throttle position from a throttle position sensor and engine temperature from a temperature sensor. Based upon this information, various control maps (that are stored in memory) are consulted to determine a desired ignition timing and a desired injection amount and timing.

In some arrangements, the engine is not an internal combustion engine. Rather, due to recent governmental regulations, electric vehicles are becoming more popular. The electric vehicles generally employ an ECU to help control output of at least one electric motor based, at least in part, upon operator demand. Nevertheless, an ECU is used to at least partially control motor operation.

Motorcycles generally require operation at a lean angle relative to vertical; the lean angle is used to assist in turning. Motorcycles occasionally tip over (e.g., are leaned too far) during operation. When a motorcycle is laid on its side when running (either because of leaning too far or because of "high siding"), fuel can spill from the fuel supply system and the laid-down orientation of the motorcycle can otherwise adversely affect engine operation. Accordingly, a system is desired that will deactivate the fuel supply system and possibly the engine during such tipping. Additionally, motorcycles can tip over if the lean angle exceeds a certain angle at which the center of gravity is out of a controllable range. Under this condition, the system also is desired to deactivate the fuel supply.

The systems described above thus need an excellent tip over detecting device that can detect if the associated motorcycle excessively leans or tips over. Conventionally, mechanical tip over detecting devices are available. However, such mechanical devices are insufficient in accuracy of detection and in reliability. Improvements of the mechanical devices need complicated manufacturing processes and increase cost thereof. Furthermore, the mechanical devices are bulky and heavy such that a relatively large space and strong brackets are required. The strong brackets also waste a certain space.

SUMMARY OF THE INVENTION

In connection with above issues, one of Applicants has discovered that semiconductor-based accelerometers can remedy in a simple and compact package. A preferred device that incorporates such an accelerometer is disclosed by the Applicant in a co-pending U.S. application, titled ACCELERATION SENSOR AND ENGINE CONTROL FOR MOTORCYCLE, which has been published as Patent Application Publication No. US2002/0039951A1. The entire content of the co-pending application is hereby expressly incorporated by reference herein.

Features of the present invention improve the lean detecting devices disclosed in the co-pending application and, in particular, can contribute to reducing errors that may occur in electrical transferring processes and also to enhancing accuracy of detection.

Some of the applications and configurations of the improved accelerometers will be discussed below. It should be noted that the following discussion relates to several distinct features of the present invention and not all of the features need to be present in any single embodiment of the present invention. Thus, some of the features may be used with other features in some applications while other applications will only reflect one of the features. In addition, the term "tip over" should not be interpreted narrowly but interpreted broadly to include excessive lean states of a motorcycle that does not reach a laid down state in the narrow sense. Moreover, the features, aspects and advantages can be applied to motorcycles in the narrow sense but also to other motor vehicles recited in the appended claims that will become apparent to those of ordinary skill in the art.

Accordingly, one aspect of the invention involves a wheeled vehicle comprising a frame, at least one front wheel coupled to the frame, and at least one rear wheel coupled to the frame. A prime mover is also coupled to the frame and is drivingly connected to at least one of the front and rear wheels. A control unit is connected to the prime mover. A sensor is coupled to the frame and communicates with the control unit. The sensor outputs a lean signal to the control unit that varies with a leaning angle of the vehicle. The sensor has at least one axis of detection and is arranged such that the axis of detection assumes a generally vertical central position when the vehicle stands upright. The lean signal is generated when the axis of detection moves from its central position as the vehicle leans. The control unit is configured to determine whether the vehicle tips over based upon the lean signal.

In accordance with another aspect of the invention, a wheeled vehicle is provided that comprises a frame, a front wheel coupled to the frame, and a rear wheel coupled to the frame. A prime mover is coupled to the frame and is connected to at least one of the front wheel and the rear wheel. A control unit is connected to the prime mover member, and a sensor communicates with the control unit. The sensor is adapted to output first and second lean signals that vary with a leaning angle of the vehicle. The control unit is adapted to determine whether the vehicle tips over primarily based upon the first signal and to verify whether the first signal is truly indicative of tip over of the vehicle based upon the second signal.

BRIEF DESCRIPTION OF THE DRAWINGS

These and other features, aspects and advantages of the present invention are described in detail below in connection with the accompanying drawings. The drawings comprise 23 figures in which:

FIG. 5(A) is a graphical depiction showing accelerometer output voltage with reference to bank angle when the accelerometer is mounted horizontally.

FIG. 5(B) is a schematic diagram showing the accelerometer mounted horizontally with the associated vehicle in a leaning position. The accelerometer leans to the right at angle θ in this figure.

FIG. 12(A) is a schematic view showing an exemplary marking to accurately position any one of the accelerometers.

FIG. 12(B) is a schematic view showing another exemplary marking to accurately position any one of the accelerometers.

FIG. 17(A) is a front elevational view of the motorcycle of FIG. 1 showing the mount arrangement.

FIG. 18(A) is a top plan view of the motorcycle of FIG. 1 showing the modified mount arrangement of the ECU.

DETAILED DESCRIPTION OF PREFERRED EMBODIMENTS OF THE PRESENT INVENTION

Motorcycle

Figure 1:
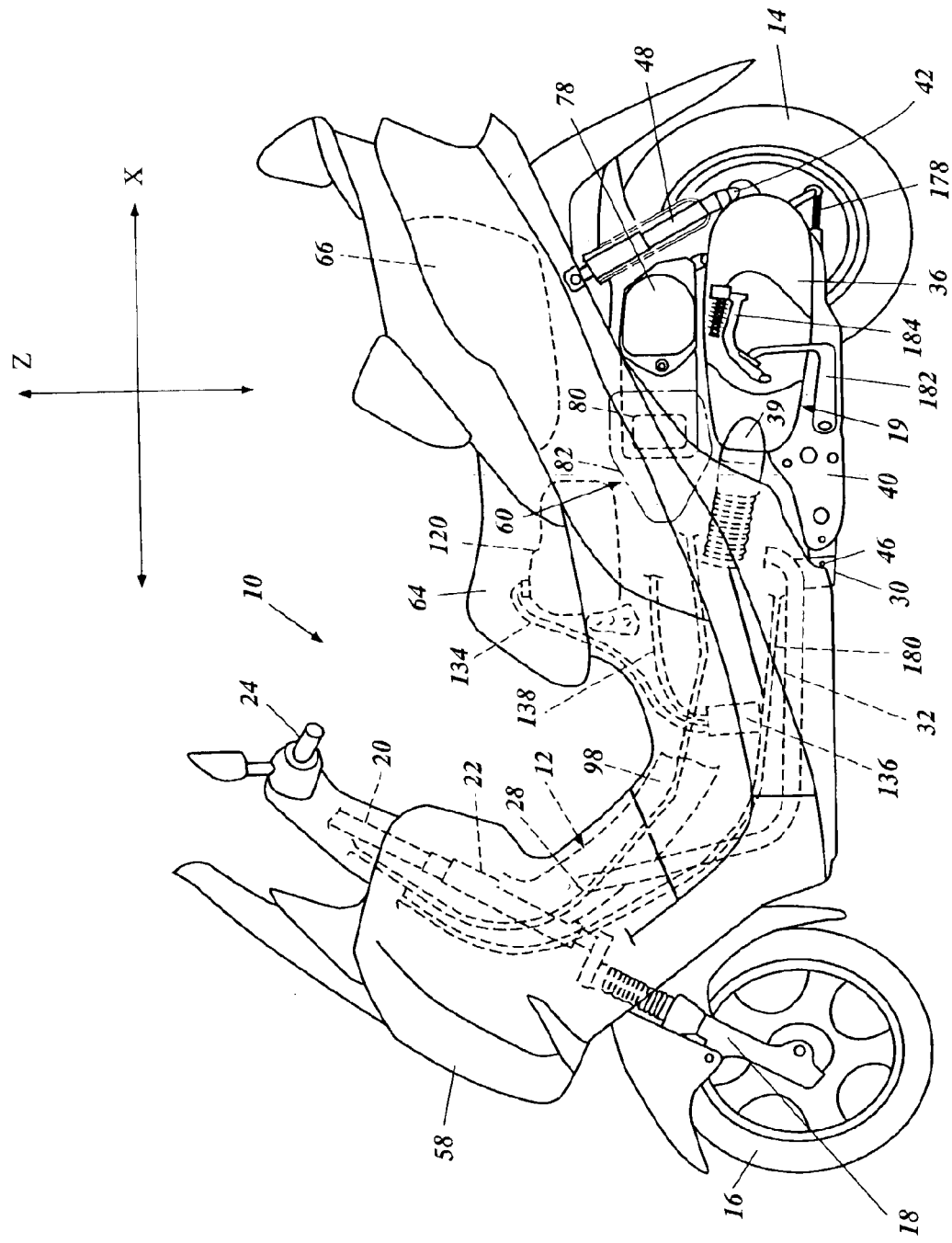
FIG. 1 is a side elevational view of a motorcycle that can be arranged and configured in accordance with certain features, aspects and advantages of the present invention. Some internal components of the motorcycle are illustrated in hidden lines.
Figure 2:
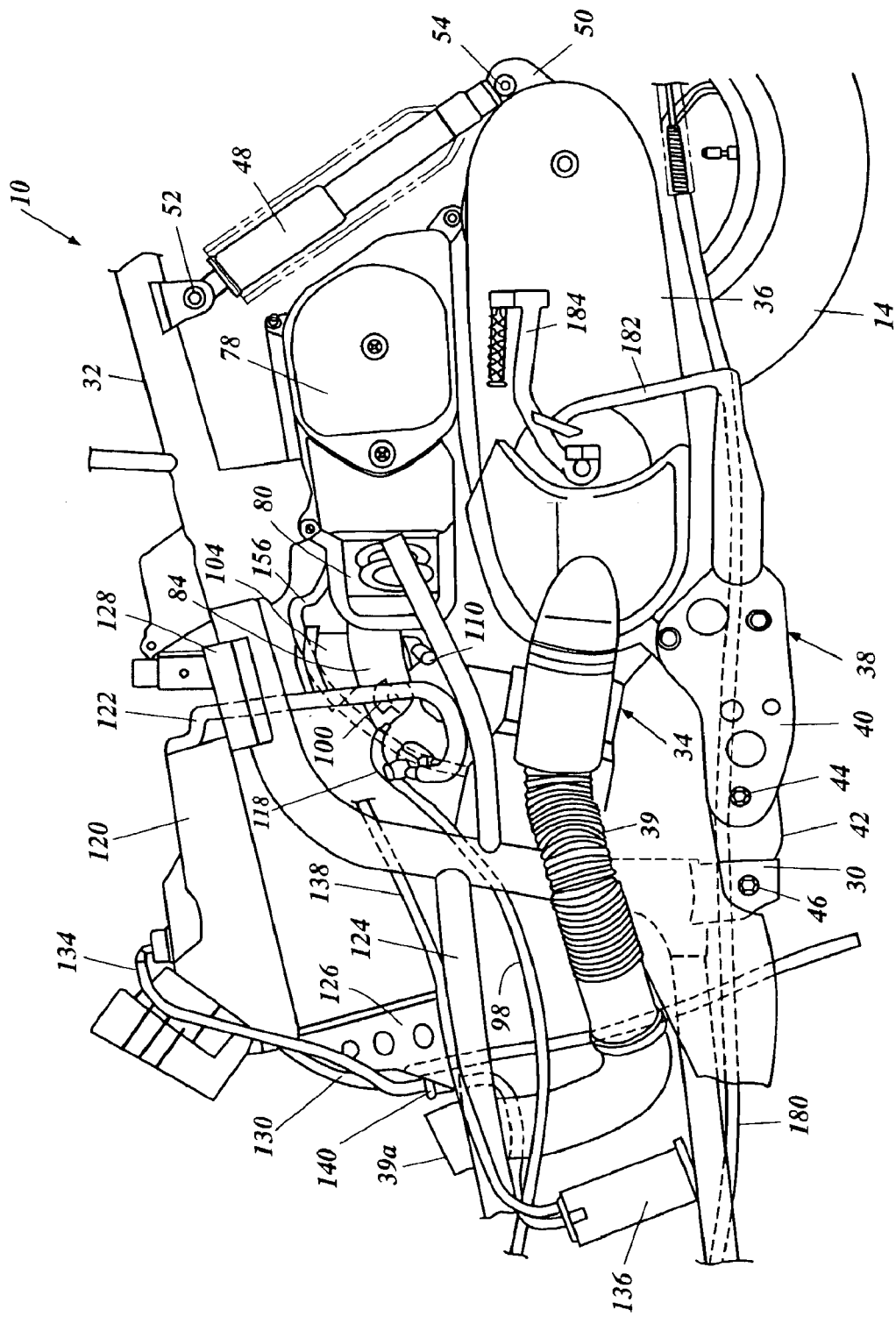
FIG. 2 is an enlarged side elevational view of the motorcycle of FIG. 1 on the same side generally showing a rear portion thereof.

With reference initially to FIGS. 1–4, an overall configuration of a motorcycle 10 that can be used with various features, aspects and advantages of the present invention will be described. The illustrated motorcycle is only one type of motor vehicle that can be used with certain aspects of the present invention.

The illustrated motorcycle 10 generally comprises a frame assembly 12 that is supported by a rear driven wheel 14 and a front steerable wheel 16. The front wheel 16 depends from a set of front forks 18 that is coupled with a steering shaft 20. A head pipe 22 that is connected with the frame assembly 12 pivotally supports the steering shaft 20. The front forks 18 are connected to a set of handlebars 24 through the steering shaft 20. The steering shaft 20 can be used to control the direction of travel of the motorcycle 10. Various other operator controls can be disposed proximate the handlebars 24.

The frame assembly 12 comprises multiple frame members such as a front frame 28, a bottom frame 30 and a pair of rear frames 32. The front frame 32 supports the head pipe 22. The rear frames 32 are connected to the front frame 32 and extend downwardly. The rear frames 32 are coupled with the bottom frame 30 at this location and extend upwardly and turn rearward. Both the rear frames 32 extend generally parallel to each other and merge together at the front frame 30.

A prime mover, such as, for example, but without limitation, an internal combustion engine or an electric motor unit, is mounted on the frame assembly 12. In the illustrated embodiment, the prime mover takes the form of an engine 34 that is unitarily coupled with a transmission housing 36 through a crankcase thereof. The engine 34 and transmission housing 36 together form an engine unit 38. A rear end of the transmission housing 38 rotatably supports the rear wheel 14.

The illustrated transmission housing 36 encloses a speed reduction assembly that drivingly connects the engine 34 to the rear wheel 14. The speed reduction assembly can comprise a V-belt stepless shifting transmission mechanism (i.e., a continuously-variable transmission (CVT) in combination with a change-speed transmission).

An air duct 39 extends from the transmission housing 36 and a distal end 39a of the duct 39 opens to the atmosphere. Air is drawn into the transmission housing 36 through the air duct 30 to cool inside of the housing 36.

A set of engine brackets 40 is affixed to the front bottom portion of the engine unit 38. Each engine bracket 40 is coupled with a link plate 42 for pivotal movement about a pivot axis 44. Each link plate 42, in turn, is coupled with the bottom frame 30 for pivotal movement about a pivot axis 46. The bottom frame 30 through the link plates 42 thus swingably supports the engine unit 38. A set of dampers (shock absorbers) 48 depend from the rear frames 32 and are coupled with the rear end of the transmission housing 36 at brackets 42 extending from both sides of the housing 36. The dampers 48 are affixed to the rear frames 32 and the bracket 50 for pivotal movement about upper and lower pivot axes 52, 54, respectively. Accordingly, the engine unit 38 and the rear wheel 14 together are suspended from and coupled to the frame assembly 12.

A body panel assembly is mounted to the frame assembly 12 and comprises a number of body panels that together encase many of the moving components of the vehicle. For instance, a front panel of cowling 58 covers a front portion of the frame assembly 12 and a set of side panels 60 cover mid and portions of the frame assembly 12.

A seat 64 is provided at generally a center of the motorcycle 10 and is affixed to the rear frames 32. A container space 66 is defined below the rear of the seat 64. The illustrated container space 68 can be used for storage of a helmet.

The illustrated engine 34 operates on a four-cycle combustion principle and has a single cylinder bore 72 (FIG. 4) in which a piston reciprocates. The cylinder bore 72 of the illustrated engine 34 generally extends horizontally. The cylinder bore, the piston and an engine body together define a single combustion chamber. A crankshaft 74 (FIG. 4), which is disposed within a crankcase of the engine 34, is connected with the piston and rotates as the piston reciprocates. The crankshaft 74 pivots about the pivot axis 46 (together with the pivot axis 44) as indicated by arrow D of FIG. 4.

The engine 34 preferably comprises an air induction system to introduce air to the combustion chamber. The air induction system comprises a plenum chamber member 78 in which a plenum chamber is defined. The plenum chamber member 78 is placed above the transmission housing 36. An air cleaner unit is provided within the plenum chamber member 78. The ambient air is drawn into the plenum chamber through an air inlet 80 disposed at a front portion of the plenum chamber member 78. A dust-proof member 82 covers the air inlet 80 to inhibit dust from entering the air inlet 80. The dust-proof member 82 preferably is made of rubber or synthetic resin.

An upstream intake conduit 83, a throttle body 84, a downstream intake conduit 86 and an intake manifold 88 connect the plenum chamber member 78 and the engine 34. An air intake passage thus is defined through both intake conduits 83, 86, the throttle body 84, and the intake manifold 83, to deliver air from the plenum chamber to the combustion chamber. The upstream and downstream intake conduits 83, 86 are curved elbow-like members. The upstream intake conduit 83 has an opening 83a within the plenum chamber member 78. The downstream conduit 86 defines a flange 90 at the end portion thereof. The intake manifold 88 also defines a flange 90. Both flanges 90 are coupled together with a plastic heat insulator 92 interposed therebetween and are affixed to each other by two bolts 94.

The throttle body 84 incorporates a throttle valve journaled for pivotal movement within the throttle body 84. A throttle cable 98 connects the throttle valve and a throttle lever or a rotatable throttle grip preferably disposed at the handlebar on the right hand side. The throttle cable 98 is coupled with a valve shaft of the throttle valve through a linkage 100. The rider thus can control a position of the throttle valve by operating the throttle lever. The throttle valve regulates the amount of air passing through the throttle body 84.

A suction piston unit 104, which preferably is of a diaphragm type, is provided upstream of the throttle valve within the throttle body 84. The suction piston unit 104 has a diaphragm chamber 106 disposed atop the throttle body 84. Atmospheric air is introduced into the diaphragm chamber 106 through an atmosphere introduction conduit 108 that has an inlet port 110 disposed at a lower portion of the throttle body 84. The inlet port 110 opens inside of the dust-proof member 82.

An auto-choke unit 114 (FIG. 3), which preferably is a heat wax type, is provided next to the suction piston unit 104 within the throttle body 84. The auto-choke unit 114 can move between an open position and a closed position of a bypass passage (not shown) that bypasses the throttle body 84.

The engine 34 preferably comprises a fuel injection system. In the illustrated arrangement, a fuel injector 118 is disposed at the downstream intake conduit 86 to spray fuel into the intake passage defined therein. The illustrated fuel injector 118 is positioned on the left side of the intake conduit 86. The fuel is supplied from a fuel tank 120 disposed beneath the seat 64 to the fuel injector 118 through a fuel delivery pipe 122. The fuel tank 120 is affixed to a set of frame members 124 via brackets 126. The illustrated fuel delivery pipe 122 extends from a rear portion of the fuel tank 120 and is affixed to the rear frame member 32 on the left hand side via a stay 128. An overflow pipe 130 (FIG. 2) extends downwardly from the fuel tank 120.

A beather pipe 134 extends between a top portion of the fuel tank 120 and a canister unit 136 disposed generally beneath one of the frame members 61. A purge pipe 138 extends from the canister unit 136 and is connected to a portion of the air induction system, such as the throttle body 84, for example. The breather pipe 134 incorporates a shutoff valve 140 that can close itself to shutoff flow of the fuel through the pipe 134 when the motorcycle 10 tips over.

The engine 34 preferably comprises an ignition system that fires an air/fuel mixture in the combustion chamber. The ignition system comprises a spark plug exposed into the combustion chamber and other ignition components such as, for example, an ignition coil.

The engine 34 preferably comprises an exhaust system to route exhaust gases from the combustion chamber. An exhaust conduit 144 (FIG. 3) extends from a portion of the engine 34 on the right hand side and rearward along the frame assembly to form an exhaust passage through which the exhaust gases are discharged. The illustrated exhaust conduit 144 contains a catalyst to clean the exhaust gases. The illustrated exhaust system employs a secondary air induction unit 146 to further purify the exhaust gases. The unit 146 preferably is connected to the intake manifold 88 through an air supply pipe 148 and also to the exhaust conduit 144 through an air delivery pipe 149. When the combustion chamber has a negative pressure, air in the induction system is supplied to the catalyst in the exhaust conduit 144 through the air supply pipe 148, the secondary air induction unit 146 and the air delivery pipe 149. Unburned mixture contained in the exhaust gases thus can be purified by oxygen of the air before being discharged.

The engine 34 preferably comprises a valve drive mechanism that can include one or more camshafts. The one or more camshafts actuate intake and exhaust valves that open and close intake and exhaust ports of the combustion chamber, respectively, in a timed manner. The camshafts are journaled within a camshaft chamber of the engine 34. The engine 34 defines openings through which the camshafts can be either inspected or repaired. A set of closure members 152 (FIG. 4) closes the openings.

The engine 34 preferably comprises a blow-by gas system. The blow-by gas system comprises an internal passage that connects the crankcase with the camshaft chamber. A blow-by gas conduit 156 communicates with the camshaft chamber and is connected to a portion of the plenum chamber member 78 at a location downstream of the air cleaner unit. Blow-by gases in the crankcase thus are delivered to the plenum chamber and then are drawn into the combustion chamber to be burned with a fresh mixture. The blow-by gas system also is useful to inhibit power loss from occurring and also to inhibit oil seals from unseating.

The engine 34 can comprise other systems, mechanisms, devices and components such as, for example, a water cooling system and a lubrication system. The cooling system includes a cooling water reserve tank 158 (FIG. 3) disposed at the rear frame member 32 on the right hand side. A battery 159 also is placed on the frame assembly to provide electric power to the electrical components. A generator driven by the engine 34 can generate the electric power and supply the power to the battery 159.

The illustrated motorcycle 10 is provided with a control unit that controls primarily operations of the engine 34. The control unit in this arrangement is an ECU 160 (FIG. 3) that comprises a central processing unit ("CPU") and memory. The CPU and memory are semiconductor chips mounted a circuit board. The ECU's memory stores various control programs and control maps (e.g., tables) that the ECU uses to control the engine. For instance, the ECU 160 controls the injection of the fuel injection system and the timing of the ignition system based upon data received from various sensors and the stored programs and control maps. Preferably, a wire-harness 162 and several wires or cables connects the ECU 160 with the sensors and other related electrical components. A preferred arrangement of the ECU 160 will be described in greater detail below with reference to FIGS. 17(A), (B).

Figure 3:
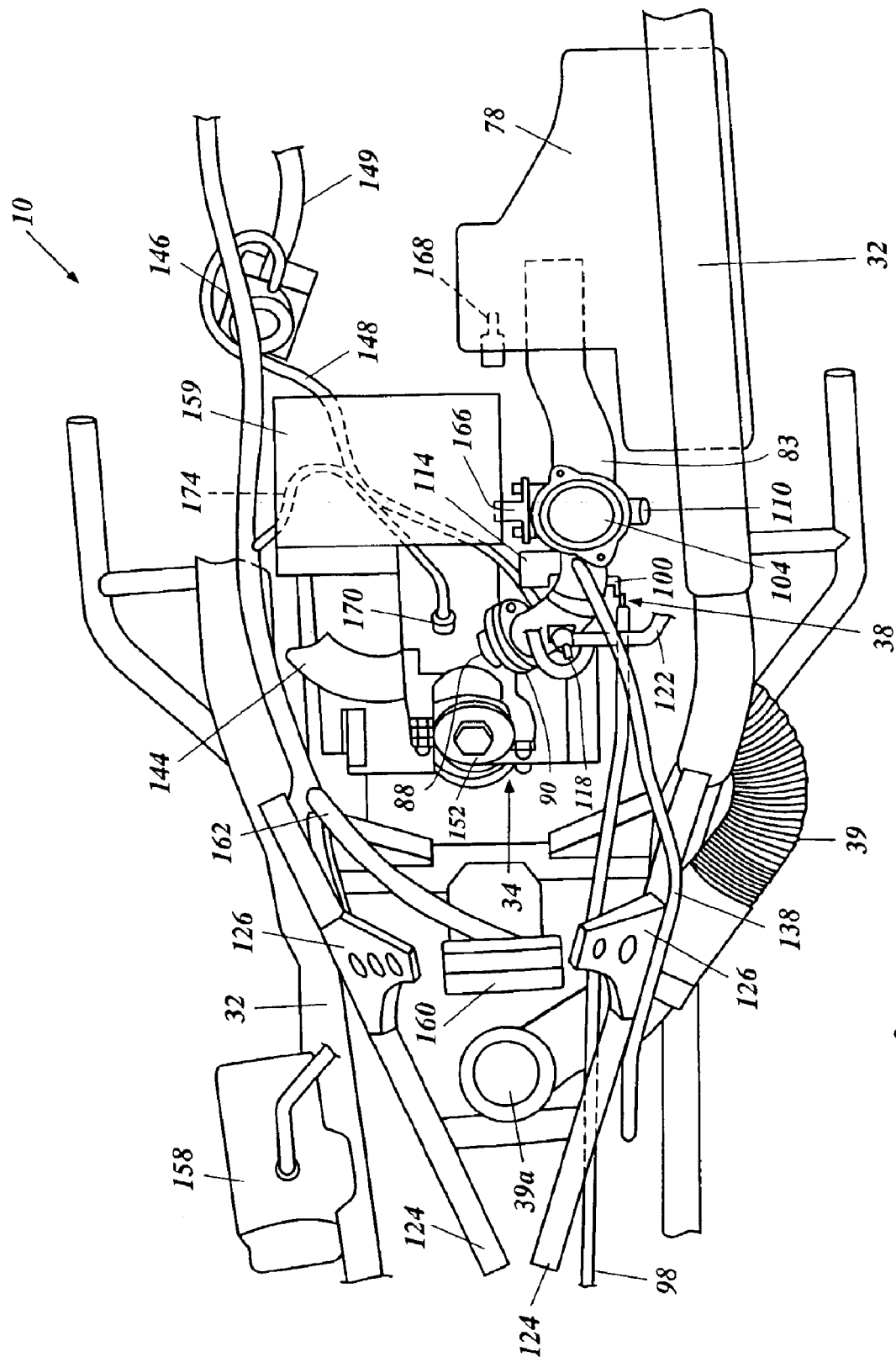
FIG. 3 is an enlarged top plan view of the motorcycle generally showing the rear portion. Some components, such as a seat are detached in this figure.
Figure 4:
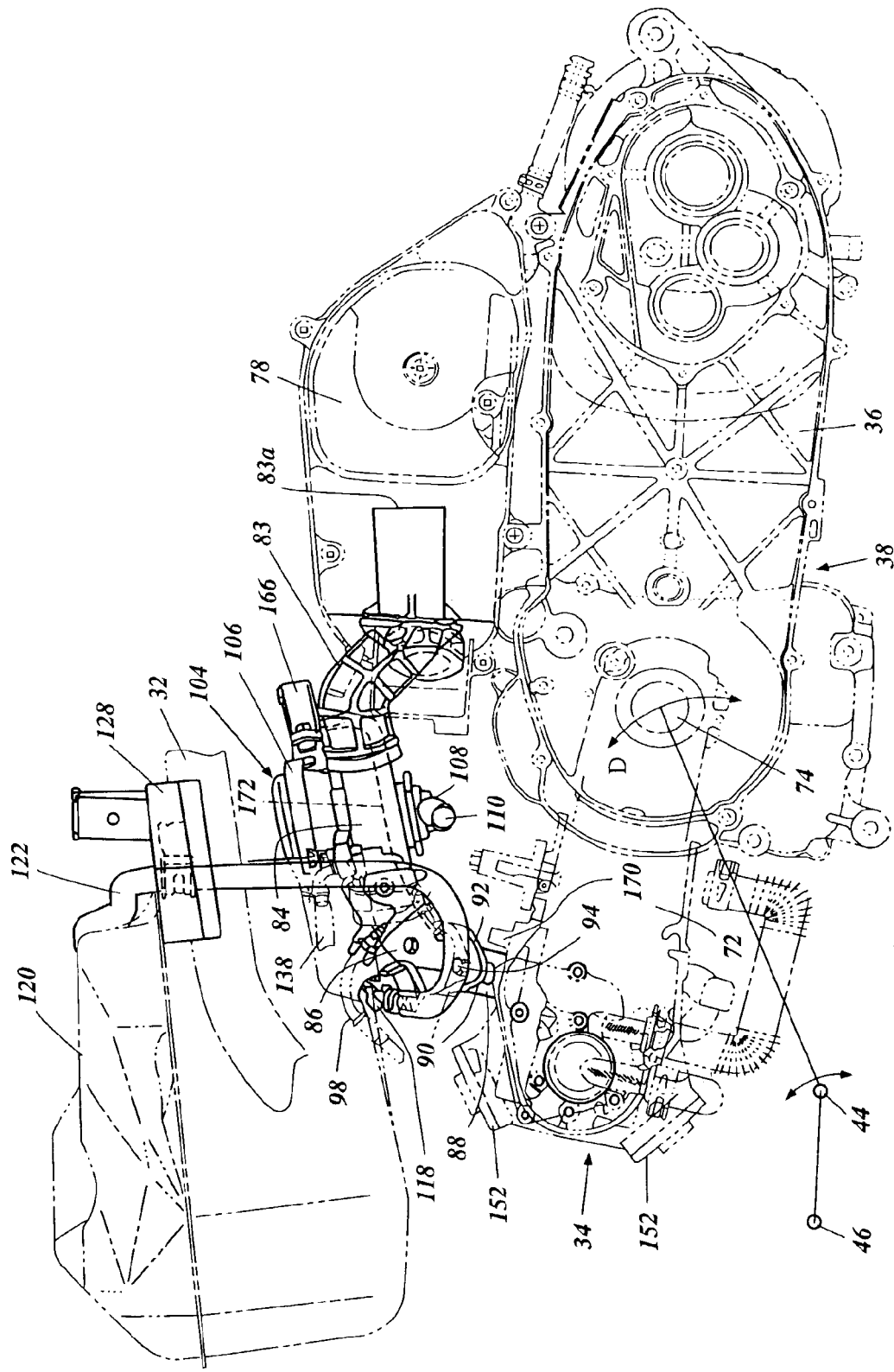
FIG. 4 is a more enlarged side elevational view of the motorcycle generally showing components around an engine of the motorcycle. The components mostly are illustrated in phantom.

The sensors can include an intake pressure sensor 166 (FIGS. 3 and 4), a throttle position sensor (not shown), an intake temperature sensor 168 (FIG. 3) and a water temperature sensor 170 (FIGS. 3 and 4). The intake pressure sensor 166 is positioned at the throttle body 84. A sensor pipe 172 (FIG. 4) connects the pressure sensor 166 with either the intake manifold 88 or the downstream intake conduit 86 to provide the intake pressure to the sensor 166. The intake pressure sensor 166 can be located adjacent to the intake manifold 88 or the downstream intake conduit 86. The throttle position sensor can be placed at the valve shaft of the throttle valve on the opposite side to the linkage 100. In this regard, the auto-choke unit 114 can be positioned upstream of the throttle valve not to interfere with the throttle position sensor. The intake temperature sensor 168 preferably is provided at the plenum chamber member 78. The water temperature sensor 170 exposes to a water jacket within the engine 34. A sensor cable 174 connects the water temperature sensor 170 with the wire-harness 162.

The tip-over detection device uses a sensor to determine a lean angle of motorcycle. In the illustrated embodiment, the sensor includes at least one accelerometer. The sensor preferably is positioned in an outer housing of the ECU 160 and will be described in additional detail below.

The motorcycle 10 can also include a brake system. The brake system illustrated embodiment comprises a brake lever disposed at one of the handlebars 24 and a brake mechanism formed at the rear wheel 14 that includes a brake camshaft 178. The brake lever and the brake camshaft 178 are connected to each other through a brake cable 180. Also, the motorcycle 10 can have a stand 182 and kick lever 184.

Tip-Over Detection Device

The motorcycle 10 can tip over or excessively lean during some operating conditions. The tip over sensor within the outer housing of the ECU 160 detects a lean condition that the ECU 160 uses to determine if the motorcycle 10 tips over or excessively leans during operation. In the illustrated embodiment, the accelerometer of the sensor generates an analog signal in response to a lean angle of the motor cycle and sends the signal to the ECU 160. The ECU 160 preferably has an analog-to-digital (A/D) converter that converts the analog signal to a digital signal. The ECU 160 then determines, based upon the digital signal, whether the motorcycle 10 has excessively leaned or tipped over. When the ECU 160 determines that the motorcycle 10 has been tipped over (i.e., has been either excessively leaned or laid down), the ECU 160 affects certain engine operations, e.g., by cutting fuel injection and/or ignition either completely or intermittently, or by other practical measures.

For the purpose of describing the tip over detection device, various components of the device will be described in connection with a directional orientations relative to the motorcycle. FIG. 1 illustrates a vertical axis Z and a longitudinal axis X. The longitudinal axis X extends along the front-to-rear length of the motorcycle and generally parallel to the ground, and the vertical axis extends perpendicular to the ground and to the longitudinal axis X. A lateral axis Y lies orthogonal to both the vertical axis Z and the longitudinal axis X, and extends along the side-to-side width of the motorcycle.

With reference now to FIGS. 5(A) and 5(B), the schematic illustration of FIG. 5(B) shows a unidirectional accelerometer 200. The accelerometer 200 is mounted such that an axis of detection 202 of the accelerometer 200 lies generally horizontal and perpendicular to the vertical axis Z when the motorcycle 10 stands upright, i.e., the motorcycle 10 does not lean.

As illustrated, if $\theta$ is the lean angle of the motorcycle 10 measured from horizontal and 1 g is the force of gravity, then the output voltage V of the accelerometer 200 is proportional to 1 g times the sine of $\theta$: $V \propto g*\sin(\theta)$. The output voltage V will produce a sine curve as shown in FIG. 5(A). If the output voltage V is set at 2,500 millivolts, for example, when the motorcycle 10 stands upright, the voltage V can be approximately 2,800 millivolts when the motorcycle 10 is laid on its right side. Meanwhile, under the same condition, the voltage V can be approximately 2,200 millivolts when the motorcycle 10 is laid on its left side.

In general, if a motorcycle leans right or left over approximately 65–70 degrees from an upright position, the motorcycle can tip over. In the illustrated arrangement, the ECU 160 has stored a critical lean angle at 70 degrees with which the ECU 160 can determine that the motorcycle 10 is tipping over. Accordingly, a determination voltage Vc of the tip over can be determined by the equation Vc ∝ 1 g*sin (70°)=0.94 g. If a conversion error introduced by the A/D converter is ±10 millivolts that corresponds to ±0.03 g, the angle error can be (0.94−0.03) g≈1 g*sin(65 degrees) or (0.94+0.03) g≈1 g*sin(75°). Thus, the angle error based upon the conversion error can be 70±5 degrees.

Figure 6A:
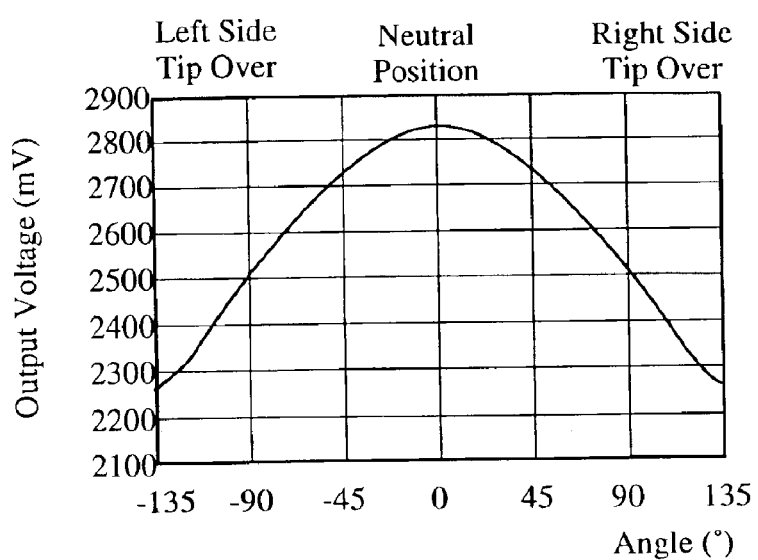
FIG. 6(A) is a graphical depiction showing accelerometer output voltage with reference to bank angle when the accelerometer is mounted vertically.
Figure 6B:
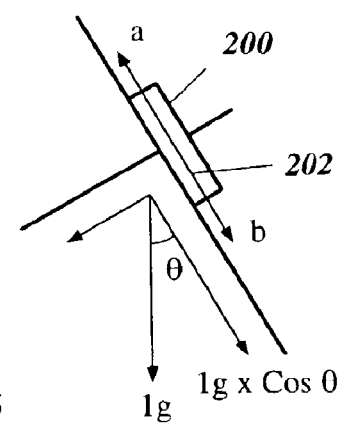
FIG. 6(B) is a schematic diagram showing the accelerometer mounted vertically with the associated vehicle in a leaning position.

With reference to FIGS. 6(A) and 6(B), the schematic illustration of FIG. 6(B) shows a unidirectional accelerometer 200 mounted such that its axis of detection 202 lies generally vertical when the motorcycle 10 stands upright, i.e., the motorcycle 10 does not lean.

As illustrated, if θ is the lean angle of the motorcycle 10 measured from vertical and 1 g is the force of gravity, then the output voltage V of the accelerometer 200 if proportional to 1 g times the cosine θ: V ∝ 1 g*cos(θ). The output voltage V will depict a cosine curve as shown in FIG. 6(A). If the output voltage V is set at approximately 2,800 millivolts, for example, when the motorcycle 10 stands upright, the voltage V can be 2,500 millivolts when the motorcycle 10 is laid down on its side.

In the similar manner described above, a determination voltage Vc of tip over in this vertical arrangement of the accelerometer 200 can be determined by the equation Vc ∝ 1 g*cos(70°)=0.34 g. If the conversion error introduced by the A/D converter is ±10 millivolts that corresponds to ±0.03 g, the angle error can be (0.34−0.03) g≈g*cos(72°) or (0.34+0.03) g≈g*cos(68°). Thus, the angle error based upon the conversion error can be 70±2 degrees.

As thus calculated, for a lean angle of 70° that can be used to vehicle determine tip over, the angle error introduced through the A/D converter in connection with the vertical arrangement of the accelerometer 200 is less than that in connection with the horizontal arrangement of the accelerometer 200. Accordingly, the vertically arranged unidirectional accelerometer 200 (FIG. 6(B)) can reduce the conversion error and enhance accuracy of detecting a critical lean angles around 70° in comparison to a horizontally arranged unidirectional accelerometer 200 (FIG. 5(B)). The accelerometer 200 described below thus is arranged generally vertically.

Bi-directional or tri-directional accelerometer can also be used in some arrangements. The bi-directional accelerometer preferably has two axes of detection (e.g., axes Y, Z) that extend normal to one another. The tri-directional accelerometer has three axes of detection (e.g., axes X, Y, Z) that extend orthogonal to one another. Assuming that the detection axis 202 of the foregoing uni-directional accelerometer 200 is axis Z, the term "vertically extending axis," "vertical axis" or "vertical detection axis" means this axis Z in this description whichever one of the unidirectional, bi-directional or tri-directional accelerometers is applied, as noted above.

The bi-directional or tri-directional accelerometer can be advantageously used for verifying if the motorcycle 10 has tipped over. That is, if the accelerometer does not detect any lean angle in either the X or Y axis even though the accelerometer detects a lean angle relative to the Z axis that exceeds or is equal to the critical lean angle, e.g., 70° in the illustrated arrangement, then the ECU 160 could determine that the motorcycle 10 has not actually tipped over and will not proceed to the stop or interrupt one or more engine operations. Such a situation could arise when, for example, the motorcycle is riding on its rear wheel during rapid acceleration (e.g., when "popping a wheely") or the motorcycle is ascending or descending a steep grade. In such situations, the accelerometer can detect a lean angle that exceeds or equals the critical lean angle in the Z direction, but not in either the X direction or Y direction. Monitoring a lean angle in either or both the X and Y directions thus will enable the ECU to determine when the motorcycle has tipped over as opposed to other operating conditions in which the motorcycle can assume a large angular orientation relative to the vertical axis Z.

Figure 7:
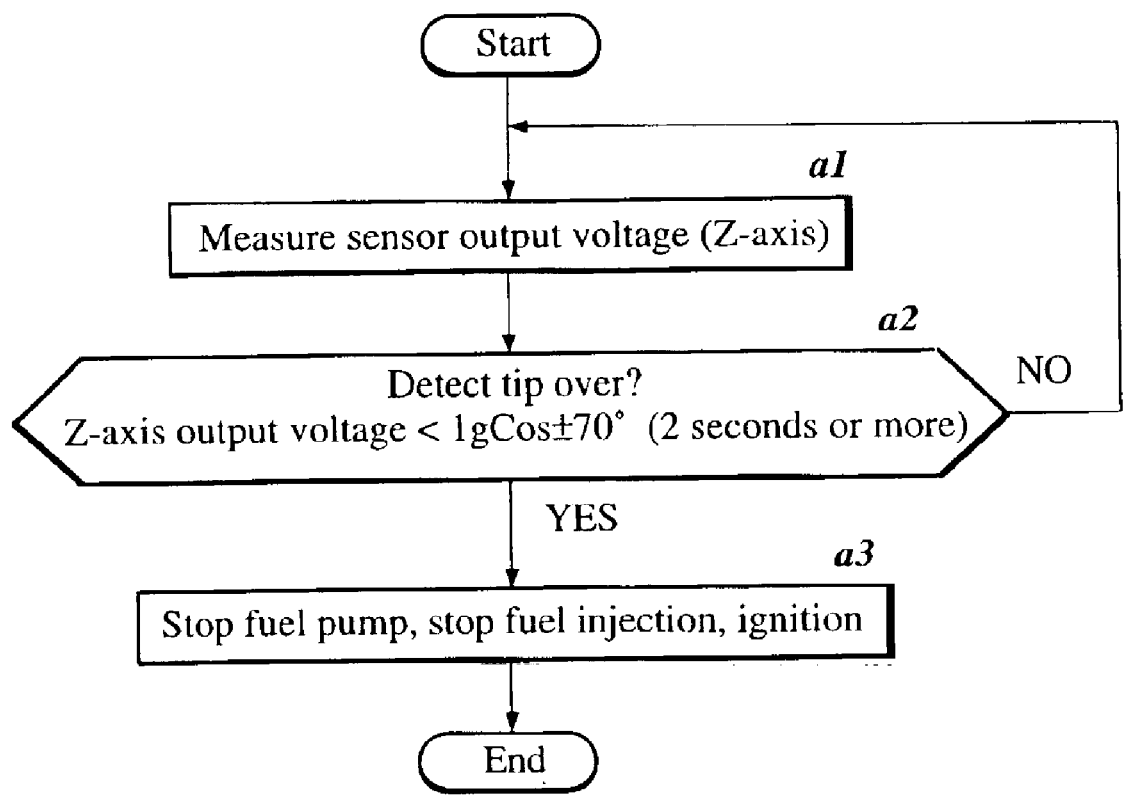
FIG. 7 is a flowchart showing an exemplary control routine arranged and configured in accordance with certain features, aspects, and advantages of the present invention. The routine employs the accelerometer output voltage of FIG. 6(A).

An embodiment of an ECU control routine for use with a sensor comprising a unidirectional accelerometer will now be described in connection with the flow chart depicted in FIG. 7. In accordance with this embodiment, tip over (i.e., excessive leaning or lay down) is determined only by detection of a lean angle in the Z direction either by a unidirectional accelerometer or by a bi- or tri-directional accelerometer. As represented in Step a1, the sensor outputs a voltage to the ECU that the A/D converter converts into a digital signal. The signal indicates a lean angle of the motorcycle relative to the vertical axis Z. The ECU then determines whether the motorcycle has tipped over (as represented in step a2). That is, the ECU determines whether the detected output voltage is less than a preset voltage that corresponds to the voltage produced when the lean angle reaches the critical lean angle (e.g., ±70°) for a preset amount of time. In the illustrated embodiment, if the measured voltage is less than the preset voltage (which indicates a lean angle greater than the critical lean angle, e.g., 70°) for two or more seconds, the ECU concludes that the motorcycle has tipped over and proceeds to affect various engine operations. If, however, the measured voltage is less than the preset voltage for less than 2 seconds or if the measured voltage is greater than the preset voltage, then the ECU continues to sample the signal from the sensor (i.e., returns to step a1). The 2-second requirement guards against false positives and inaccurate determinations that the motorcycle has tipped over. The reliability of the system hence is improved.

As represented in step a3, the ECU preferably stops or interrupts fuel pump operation, fuel injection and ignition when the ECU determines that the motorcycle has tipped over. Under this condition, the ECU preferably slows the engine in a gradual manner. For example, the ECU can thin ignitions such that ignition is skipped at relatively long intervals initially, and then gradually skipped at shorter intervals in order to gradually slow down the engine. A similar approach can be used with fuel injection, by either skipping or shortening the duration of each fuel injection event, or by doing both. In regard to the latter, an application of a drive pulse signal to a solenoid of an injector is gradually. Controlling fuel injection can be done in place of or along with ignition control. Additionally, in the case of a vehicle having an electronic throttle, the output may be reduced by controlling the electronic throttle.

Figure 8:
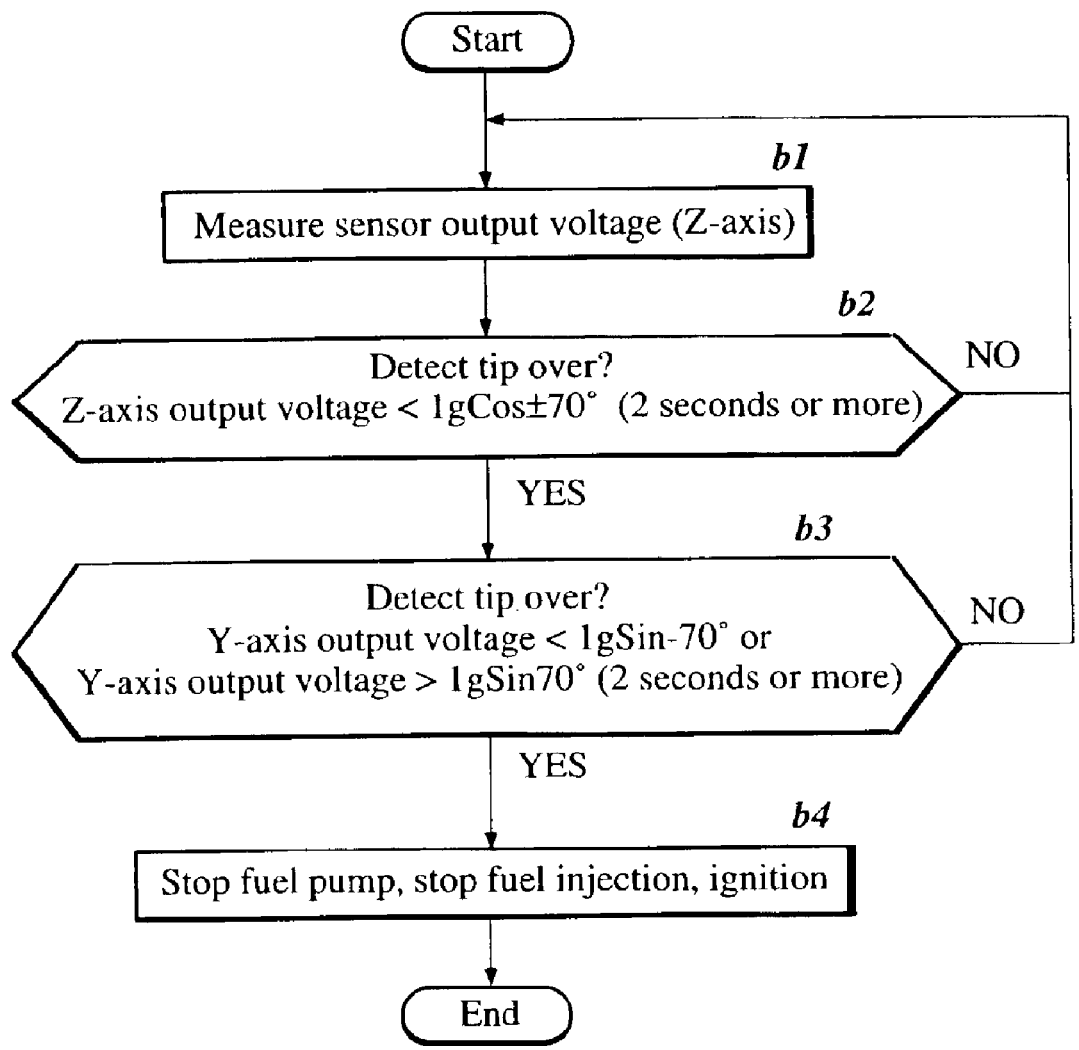
FIG. 8 is a flowchart showing another control routine used by the control system of FIG. 7. The routine employs both the accelerometer output voltages of FIG. 6(A) and FIG. 5(A).

FIG. 8 illustrates a flowchart depicting the steps of another embodiment of the control routine for the ECU that embodies additional aspects and features of the invention. In accordance with this embodiment, a bi-directional sensor is used to monitor vehicle lean angle in Y direction (i.e., side-to side) in addition to the lean angle in the Z direction. The bi-directional sensor is vertically arranged, as illustrated in FIG. 6, with its detecting directions aligned with the Z-axis (vertical) and the Y-axis (left to right). Output voltages from the sensor represents lean angles relative to the Z and Y axes.

The Z-axis measurement can detect pitch and roll of the vehicle, while the Y-axis measurement can detect roll and yaw of the vehicle. Accordingly, if the Z-axis measurement indicates a lean angle in excess of the critical lean angle, yet the Y-axis does not, the ECU can determine that the vehicle is riding on one wheel or is ascending or descending a steep slope as opposed to have been tipped over. In this manner, the ECU differentiates these various conditions from each other.

In particular, the ECU receives the converted signals from the bi-directional acceleration sensor via the A/D converter (as represented by step b1). The signals indicate the lean angles relative to the Z and Y axes. Step b2 involves determining whether the motorcycle has tipped over by looking at the converted signal for the Z-axis. That is, the ECU determines whether the output voltage from the sensor is less than a preset voltage that corresponds to the voltage produced when the lean angle reaches the critical lean angle (e.g., ±70°) for a preset amount of time. In the illustrated embodiment, if the measured voltage is less than the first preset voltage (which indicates a lean angle greater than the critical lean angle, e.g., 70°) for two or more seconds, the ECU concludes that the motorcycle has tipped over and proceeds to affect various engine operations. If, however, the measured voltage is less than the preset voltage for less than 2 seconds or if the measured voltage is greater than the preset voltage, then the ECU continues to sample the signal from the sensor (i.e., returns to step b1).

In the event that the Z-axis signal indicates that the motorcycle has tipped over, the ECU then determines whether the Y-axis signal from the sensor confirms this event (as represented in Step b3). That is, the ECU determines whether the Y-axis signal is larger than a second preset voltage value (that corresponds to when the lean angle reaches a critical lean angle (e.g., +70°)) or whether the Y-axis signal is smaller than a third preset voltage valve (that corresponds to when the lean angle reaches a critical lean angle in the opposite direction (e.g., −70°)). Two different preset valves are used because the sensor will generate a smaller voltage for a tip over condition to the left side than it will for a tip over condition to the right side (see FIG. 5A). The ECU concludes that the vehicle has tipped over when the output voltage for the Y-axis either is greater or less than the respective preset voltage for two or more seconds. If the occurrence last for less than two seconds or if the output voltage is between the second and third preset voltages, the ECU returns to sampling the signals from the sensor (as represented by step b1). For example, when the motorcycle is ascending a steep hill, the Z-axis voltage output can indicate a lean angle of greater than the first preset voltage, but the Y-axis voltage output will fall between the second and third preset voltages. The ECU then returns to step b1 and continues normal operation of the engine.

In the event that the ECU determines that the motorcycle has tipped over, the ECU stops the fuel pump, fuel injection and ignition, as represented by step b4. As noted above, however, it is preferred that the ECU gradually slow the engine by using one or more of the approaches described above.

Figure 9:
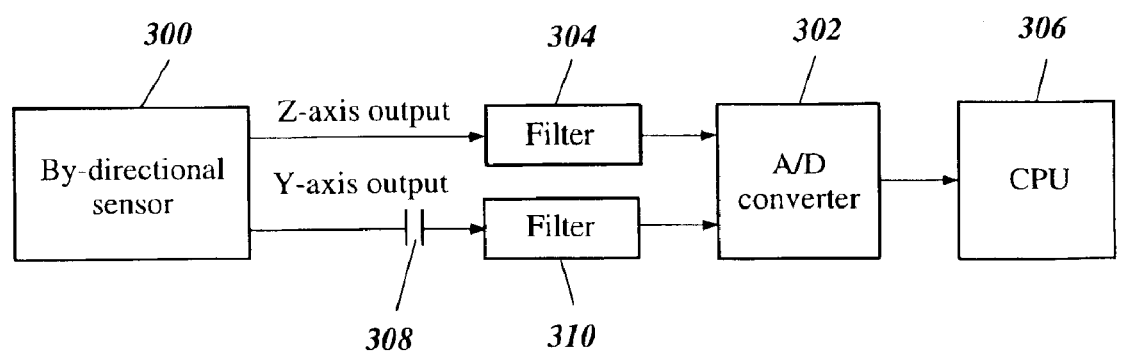
FIG. 9 is a schematic diagram showing a modified control system using the outputs of FIG. 6(A) and FIG. 5(A).

FIG. 9 schematically illustrates, in block diagram form, an additional embodiment of the tip over detection device that embodies additional aspects and features of the invention. In accordance with this embodiment, when a bi-directional or tri-directional acceleration sensor is used, input to ECU for determining tip over is divided into two routes: a DC input and an AC input.

As illustrated, a Z-axis output signal from a Z-axis sensor of a bi-directional acceleration sensor 300 is sent to an A/D converter 302 via a noise removing filter 304. The signal is subjected to A/D conversion in the A/D converter 302 and is sent as a DC signal to the ECU 306 in order for the ECU to determine the tip over state by operation processing.

The Y-axis output signal from a Y-axis sensor of the bi-directional acceleration sensor 300 is sent to the A/D converter 304 via a smoothing capacitor 308 and a filter 310. The signal is subjected to A/D conversion at the A/D converter 304 and is sent as an AC signal to the ECU 306 in order for the ECU to determine the tip over state by operation processing.

The Y-axis sensor is an auxiliary sensor for preventing erroneous detection of a tip over state when the motorcycle runs only on its back wheel (i.e., wheelies), when ascending a steep hill, or during similar vehicle operating conditions. The Y-axis sensor will not detect pitching of the motorcycle under such operating conditions, but will sense yaw and roll movement. Quick changes in roll is indicative of a tip over condition. Thus, the signal from the Y-axis sensor can be used to detect rapid changes in the amount of roll (i.e., side to side movement). This allows the ECU to compare differences in the input signal and look for rapid changes in the signal rather than compare the signal to a stored value. This approach removes the conversion error associated with the Y-axis sensor, which was discussed above in connection with FIGS. 5A and 5B.

Figure 10:
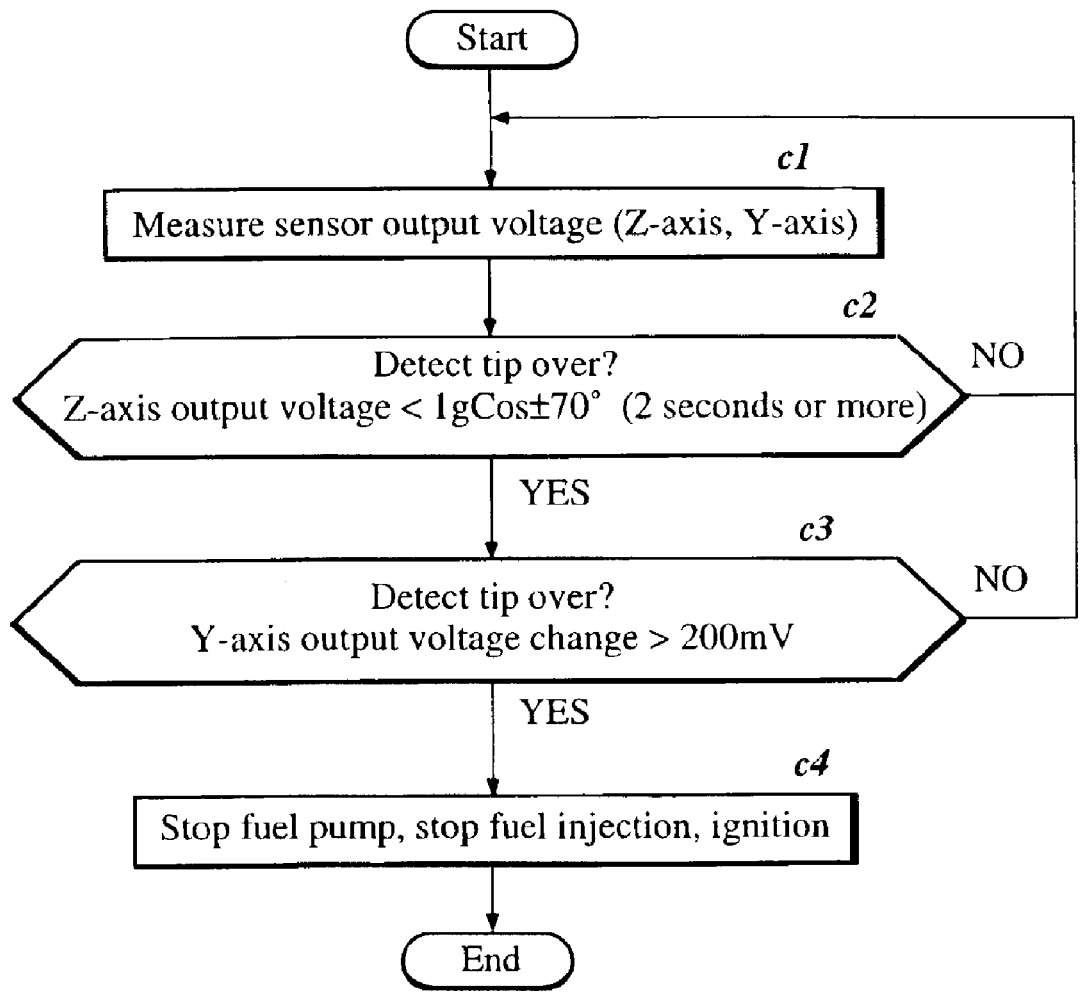
FIG. 10 is a flowchart showing a further control routine in connection with the modified control system of FIG. 9.

FIG. 10 depicts a flow chart showing the operation of the tip over detection device of FIG. 9. In step c1, the ECU measures the sensor output voltages. The bi-directional acceleration sensor is arranged vertically with its detecting axes oriented vertically and laterally, i.e., corresponding to the Z and Y axes. Output voltages of the acceleration sensor are detected with respect to Z-axis and Y-axis directions.

In step c2, the ECU determines whether the motorcycle has tipped over by detecting the output voltage of the Z-axis direction sensor. That is, the ECU determines whether the detected output voltage is less than a preset voltage that corresponds to the voltage produced when the lean angle reaches the critical lean angle (e.g., ±70°) for a preset amount of time. In the illustrated embodiment, if the measured voltage is less than the preset voltage (which indicates a lean angle greater than the critical lean angle, e.g., 70°) for two or more seconds, the ECU concludes that the motorcycle has tipped over and proceeds to the next step. If, however, the measured voltage is less than the preset voltage for less than 2 seconds or if the measured voltage is greater than the preset voltage, then the ECU continues to sample the signal from the sensor (i.e., returns to step c1).

At step c3, the ECU verifies tip over by looking at the signal from the Y-axis sensor. The ECU determines whether the output voltage of the horizontal Y-axis sensor is rapidly changed by monitoring the signal from the capacitor 308 (for example, 200 mV). The ECU does not need to calculate a difference from the neutral position or compare the signal with a preset value. When there is not a rapid change in inclination in the horizontal direction (i.e., left and right direction), such as, for example, when the output voltage from the capacitor is equal to or smaller than 200 mV, the ECU returns to step c1. The positive result produced in step c2 simply indicated a condition where the motorcycle leaned in the fore-aft direction by a significant degree (such as descending a steep hill) relative to the horizontal, but the motorcycle was upright in the side-to-side direction (i.e., the lateral or Y-axis direction).

If the ECU determines from step c3 that the motorcycle has tipped over, the ECU stops the fuel pump, fuel injection and ignition, as represented by step c4. As noted above, however, it is preferred that the ECU gradually slow the engine by using one or more of the approaches described above.

Figure 11:
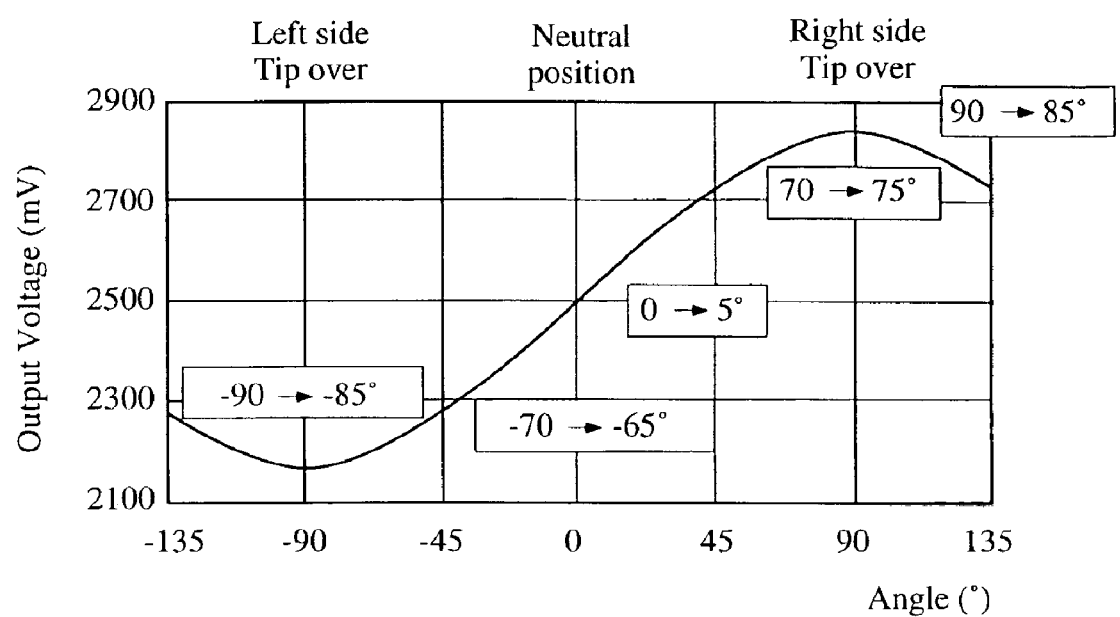
FIG. 11 is a graphical depiction showing a further accelerometer output voltage.

FIG. 11 is an explanatory diagram that illustrates additional aspects, features and advantages of the invention. The preset voltage (that corresponds to a critical lean angle, e.g., 70°) can be changes in order to correct inaccuracies in the lean angle caused by an error in attaching the acceleration sensor either to the motorcycle or to the circuit board.

In accordance with this aspect, an angle of the error in attaching the acceleration sensor is measured and the threshold (i.e., preset valve) is changed by an amount of the measured angle. In measuring the attaching error angle, in the case of the horizontal sensor, sensor output preferably is measured at three points, −90°, 0°, +90°, and the attaching error angle is calculated from a result of the measurement. In the case of a vertical sensor, the sensor output preferably is measured at three points, 0°, 90°, 180°, and the attaching error angle is calculated from a result of the measurement.

The following explains the calculation for the horizontal measurement as an example:

$$-90°: Y = a + X \sin(-90 + b) = a - X \cos(b)$$

$$0°: Y' = a + X \sin(b)$$

$$+90°: Y'' = a + X \sin(90 + b) = a + X \cos(b)$$

where notations Y, Y', Y" designate output voltages, notation "a" designates an offset voltage, notation X designates sensitivity and notation b designates a sensor inclination (attaching error angle). Here, $a = (Y - Y'')/2$ from $Y + Y'' = 2a$, and hence $$X = (Y'' - Y)/2 \cos(b) \text{ from } Y'' - Y = 2X \cos(b) \text{ and}$$

$$2 \cos(b) \cdot \sin(b) = \sin(2b) = (Y'' - Y)/(Y' - a) \text{ from}$$

$$Y' - a = X \sin(b) = (Y'' - Y)/\{2 \cos(b) \cdot \sin(b)\}.$$

Therefore, $b = \frac{1}{2} \cdot \sin^{-1}\{(Y'' - Y)/(Y' - a)\}$. The threshold (i.e., preset value) for determining tip over is changed based on the inclination angle b calculated in this manner.

According to the example of FIG. 11, for the horizontal sensor, when the sensor is inclined by +5° due to a mounting error (i.e., b ++5°), the threshold values are changed from ±70° to −65° and +75°. In the case of the vertical sensor (Z-axis sensor) of the bi-directional acceleration sensor, the threshold can be changed in accordance with the left and right direction by determining the left and right inclination direction from the Y-axis sensor.

FIGS. 12(A) and 12(B) illustrate explanatory views of additional aspects and features of the present invention. According to the embodiments illustrated in these figures, markings 400, 402 on the printed circuit board 404 can be used to automatically check the orientation of the sensor 406 on the board (e.g., by optically inspecting the orientation). The markings 400, 402 are printed on the circuit board before the sensor is attached and are configured so as to indicate an allowable range of inclination or an angle of attaching the acceleration sensor 406 to the board 404. The shape of the making is not limited to those in FIGS. 8(A) and 8(B), but may be any shapes so far as an angle thereof can be identified.

By marking in this way, the error of attaching the acceleration sensor relative to the printed board can be identified, and the preset value corresponding to tip over can be corrected based thereon. Additionally, a product manufactured outside of the indicated tolerances can easily be determined.

The printed board on which the acceleration sensor is mounted is contained in a case of the ECU. The CPU preferably is also mounted on the same board. In this case, it is preferable to provide a guide in the ECU case. The board is inserted and is positioned in the case by sliding the printed board along the guide. The printed board preferably is fixedly held at a predetermined position in the case by filling the case with resin or the like. In this manner, lean angle detection error caused by errors in attaching the printed board in the case of the ECU is reduced.

In the operation of mounting the ECU, which includes the tip over sensor, to the vehicle body, the ECU preferably is attached as near to the gravitational center of the vehicle as possible. Such positioning reduces the effects of vibration and shock on the tip over sensor and thus enhances detection accuracy.

Figure 13:
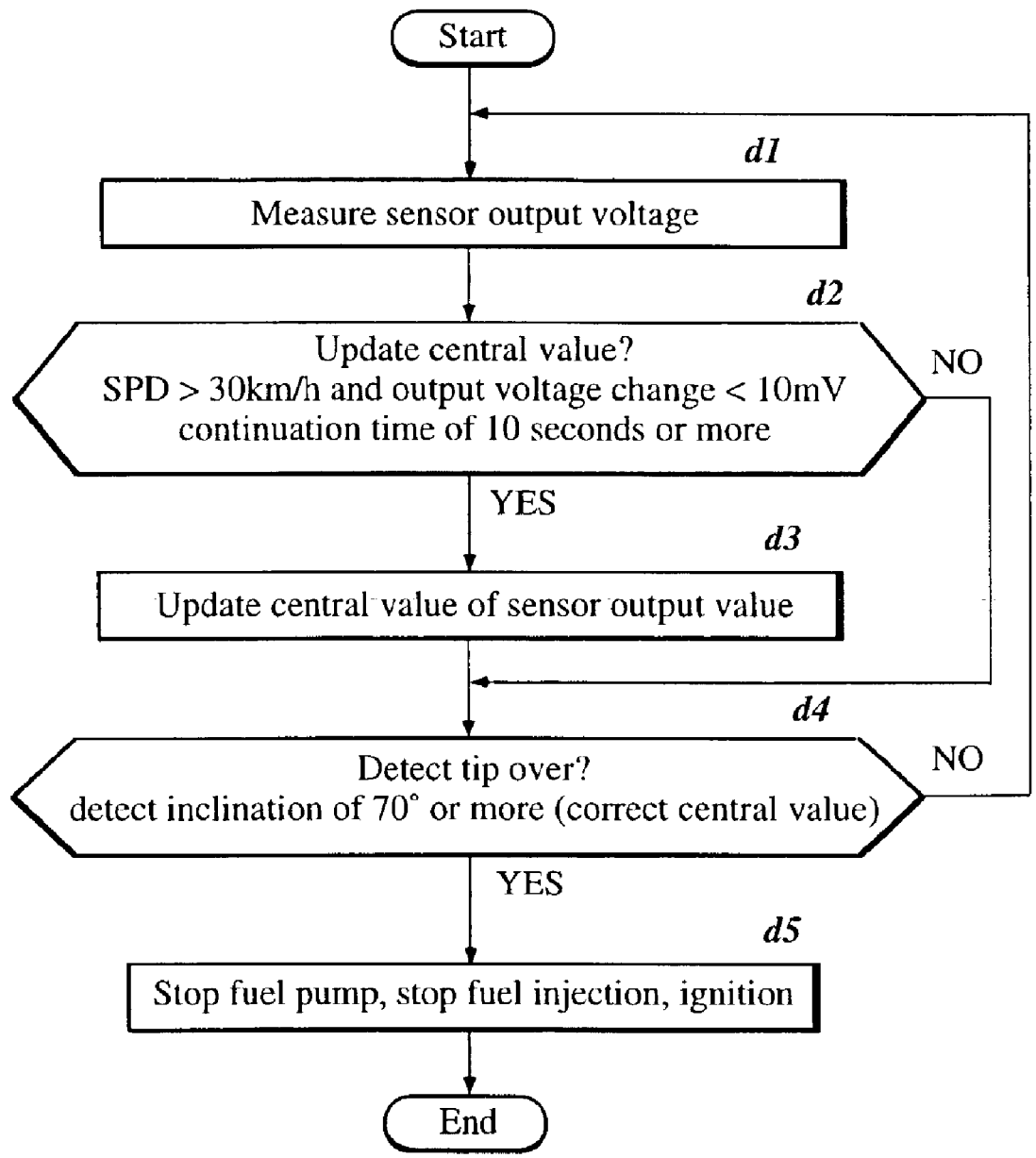
FIG. 13 is a flowchart showing a still further control routine using one accelerometer output voltage and an output from a speed sensor.

FIG. 13 illustrates a flowchart depicting the steps of another embodiment of the control routine for the ECU that embodies additional aspects and features of the invention. According to the embodiment, the detection accuracy is improved by compensating for errors introduced by temperature, sensor age deterioration and the like. The system is designed to update the central position of the Z-axis, i.e., the position of the Z-axis when the motorcycle is upright, in order to correct signal drift over time or due to temperature changes. That is, using FIG. 6(A) as an example, the output voltage for the neutral or central position is slightly more than 2800 millivolts as the sensor is initially installed, however, over time, the output voltage can significantly vary which will shift the cosine curve either up or down. Accordingly, by readjusting the output voltage corresponding to the central or neutral position, the ECU can compensate for inaccuracies due to temperature or sensor deterioration. A speed sensor is used for this purpose, as explained below.

In step d1, the speed sensor detects the motorcycle's speed and the tip over sensor detects the inclination of the motorcycle body. The ECU, in step d2, determines whether the central value of the output voltage, which corresponds to the neutral or central position of the motorcycle (i.e., the upright position of the motorcycle), needs to be updated. For this purpose, the ECU determines whether (1) the vehicle speed exceeds a predetermined speed (30 km/h for example), (2) an output voltage change from the tip over sensor (as passed through a capacitor) is less than a predetermined value (e.g., 10 mV), and (3) both of these conditions continue for 10 seconds or more. When the state continues for 10 seconds or more, the ECU determines that the vehicle body is running in a straight attitude (i.e., is not leaning).

When it is determined in the above-described step d3 that the vehicle body is running upright, an output of the tip over sensor or an average value thereof is updated and held in memory as a central value (output voltage value at the neutral position of FIGS. 5(A) and 6(A)).

The ECU then determines, in step d3 whether the motorcycle has tipped over (inclination is 70° more) by detecting a change from the central value. Thereby, tip over can be accurately detected regradless of the temperature characteristic, attaching errors, or sensor deterioration over time.

If the ECU determines from step d4 that the motorcycle has tipped over, the ECU stops the fuel pump, fuel injection and ignition, as represented by step d5. As noted above, it is preferred that the ECU gradually slow the engine by using one or more of the approaches described above.

Figure 14:
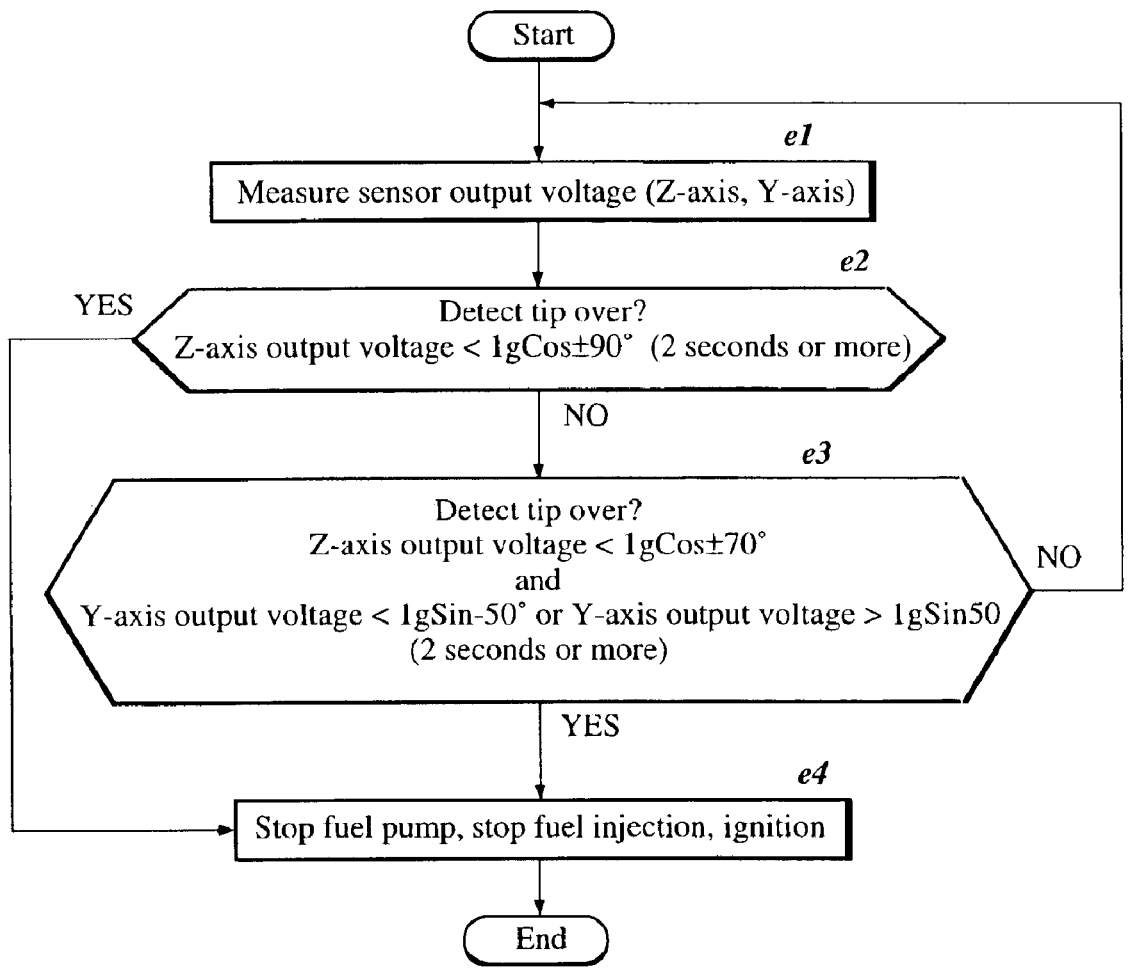
FIG. 14 is a flowchart showing a yet further control routine using two accelerometer output voltages.

FIG. 14 illustrates a flowchart depicting the steps of an additional embodiment of the control routine for the ECU that embodies additional aspects and features of the invention. According to the embodiment, reliability in determining inclination of the vehicle body other than when tipped over, e.g., when ascending a steep hill or the like, is further enhanced over the routine illustrated in FIG. 8. That is, as described above in connection with the embodiment of FIG. 8, when the vehicle body is brought into a state of being upside down or turned over by more than 90°, the ECU does not detect that the motorcycle has tipped over. The present embodiment provides steps for the ECU to make such a determination in the event that the motorcycle turns over by more than 90°.

When the vehicle body is turned over by 180°, the output of the vertical Z-axis sensor becomes 1 gCos(180°)=−1 g as understood from FIG. 6(B). Meanwhile, the output of the horizontal Y-axis sensor becomes 1 gSin(180°)=0 g as understood from FIG. 5(B), mentioned above, erroneously determining a state of not being turned over.

The present embodiment prevents such an erroneous determination and determines tip over regardless of the Y-axis sensor when inclination of ±90° or more is detected by the Z-axis sensor. Preferably, a bi-directional acceleration sensor is vertically arranged with detecting directions corresponding to the Z-axis (up and down direction) and the Y-axis (left and right direction). Output voltages of the acceleration sensor are generated with regard to Z-axis and Y-axis directions and sent to the ECU, as represented in step e1.

In step e2, upside-down roll over (turn over of ±90° or more) is determined by detecting the output voltage of the Z-axis direction sensor. That is, as understood from the above-described cosine curve of FIG. 6(A), the output voltage for inclination angles greater than 90 degrees is less than the output voltage at 90 degrees. The ECU determines whether the motorcycle has tipped by more than 90 degrees by looking at the converted signal for the Z-axis. The ECU thus determines whether the output voltage from the Z-axis sensor is less than a first preset voltage that corresponds to the voltage produced when the inclination angle reaches ±90° for a preset amount of time. In the illustrated embodiment, if the measured voltage is less than the first preset voltage (which indicates a lean angle greater than ±90°) for two or more seconds, the ECU concludes that the motorcycle has rolled over and proceeds to affect various engine operations. If, however, the measured voltage is less than the preset voltage for less than 2 seconds or if the measured voltage is greater than the preset voltage, then the ECU continues to step e3 to determine whether the motorcycle has tipped over.

The ECU determines whether the output voltage from the sensor is less than a preset voltage that corresponds to the voltage produced when the lean angle reaches the critical lean angle (e.g., ±70°) for a preset amount of time. In the illustrated embodiment, if the measured voltage is less than the second preset voltage (which indicates a lean angle greater than the critical lean angle, e.g., 70°) for two or more seconds, the ECU concludes that the motorcycle has tipped over and proceeds to affect various engine operations. If, however, the measured voltage is less than the preset voltage for less than 2 seconds or if the measured voltage is greater than the preset voltage, then the ECU continues to sample the signal from the sensor (i.e., returns to step e1).

In the event that the Z-axis signal indicates that the motorcycle has tipped over, the ECU then determines whether the Y-axis signal from the sensor confirms this event (as represented in Step e3). That is, the ECU determines whether the Y-axis signal is larger than a third preset voltage value (that corresponds to when the lean angle reaches a critical lean angle (e.g., +50°)) or whether the Y-axis signal is smaller than a fourth preset voltage valve (that corresponds to when the lean angle reaches a critical lean angle in the opposite direction (e.g., −50°)). In this embodiment, the tip over determining reference angle is set to ±50°. Thereby, the detection accuracy of the horizontal Y-axis sensor is enhanced in comparison to that obtain when the determining angle is set to ±70°, as understood from the above-described of FIG. 5(A).

Two different preset valves are used because the sensor will generate a smaller voltage for a tip over condition to the left side than it will for a tip over condition to the right side (see FIG. 5A). The ECU concludes that the vehicle has tipped over when the output voltage for the Y-axis either is greater or less than the respective preset voltage for two or more seconds. If the occurrence last for less than two seconds or if the output voltage is between the third and fourth preset voltages, the ECU returns to sampling the signals from the sensor (as represented by step b1). For example, when the motorcycle is ascending a steep hill, the Z-axis voltage output can indicate a lean angle of greater than the first preset voltage, but the Y-axis voltage output will fall between the third and fourth preset voltages. The ECU then returns to step e1 and continues normal operation of the engine.

In the event that the ECU determines that the motorcycle has tipped over, the ECU stops the fuel pump, fuel injection and ignition, as represented by step e4. As noted above, however, it is preferred that the ECU gradually slow the engine by using one or more of the approaches described above.

Figure 15:
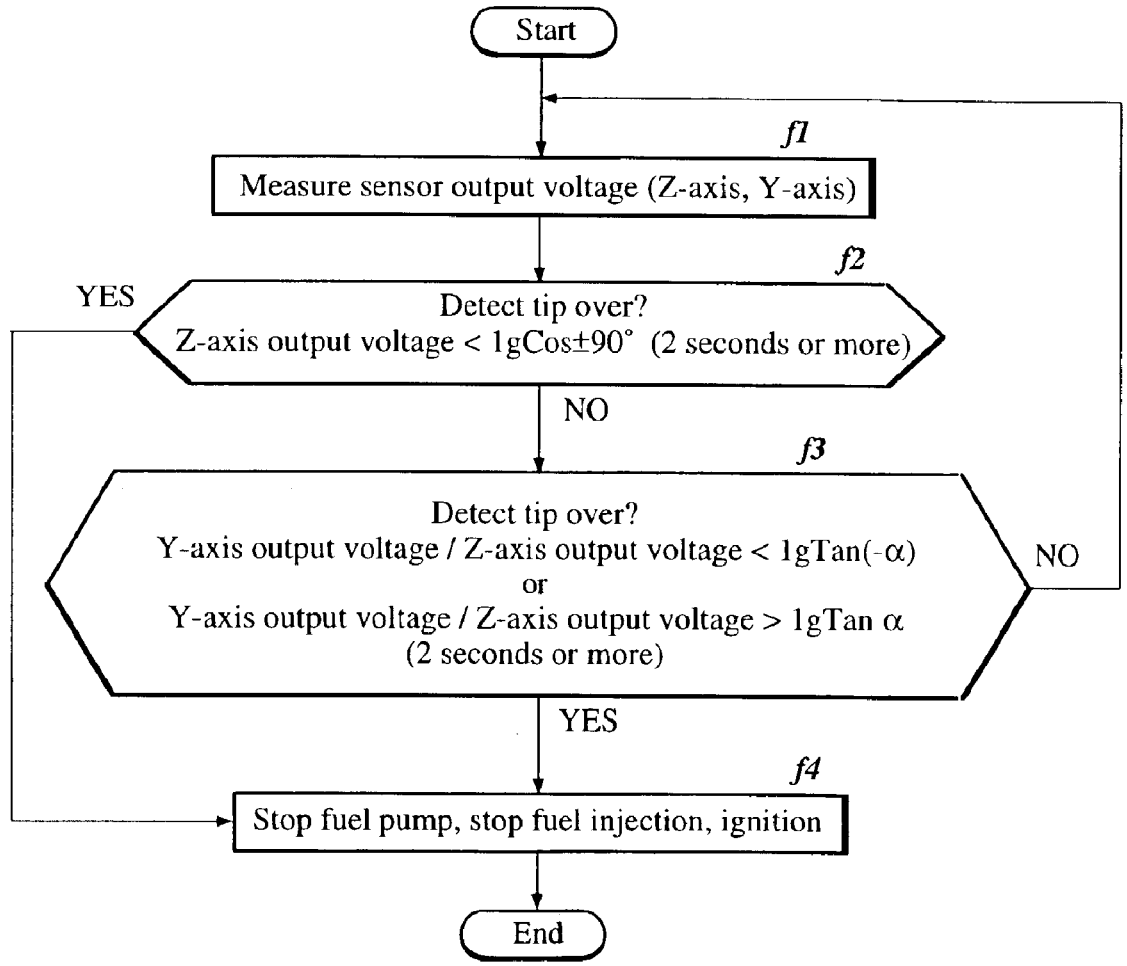
FIG. 15 is a flowchart showing an additional control routine using two accelerometer output voltages.
Figure 16:
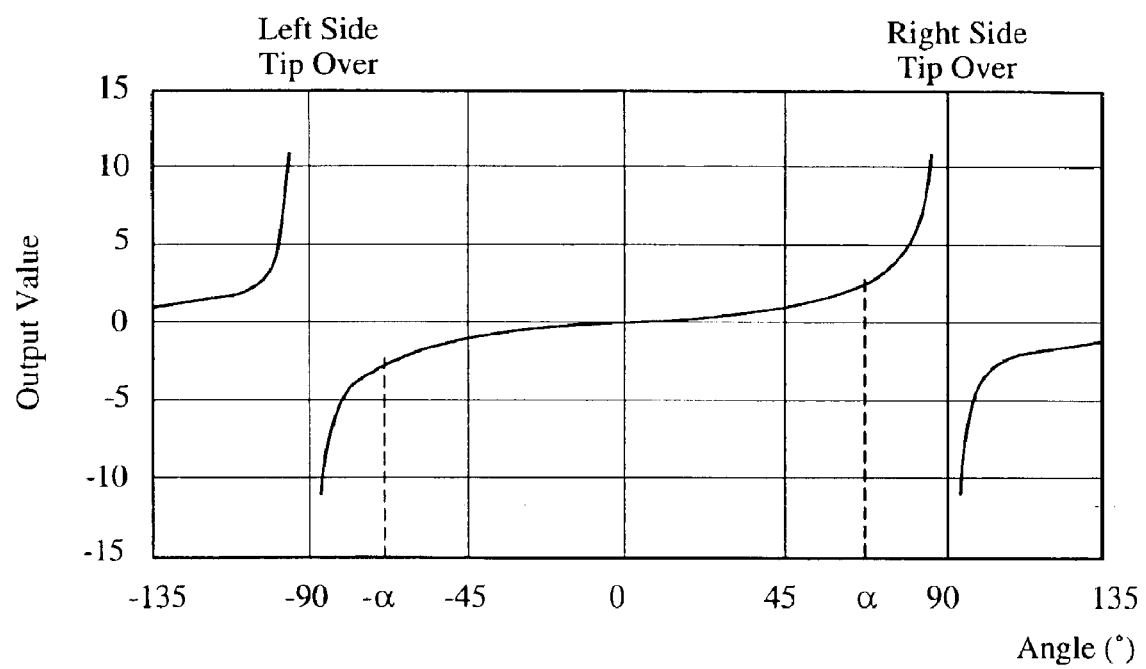
FIG. 16 is a graphical depiction showing a still further accelerometer output voltage in connection with the control routine of FIG. 15.

FIG. 15 illustrates a flowchart depicting the steps of another embodiment of the control routine for the ECU that embodies additional aspects and features of the invention. FIG. 16 is a graph illustrating data obtained using the tangent of the lean angle obtained by use of a bi-directional or tri-directional sensor.

When an acceleration sensor is provided on a motorcycle, noise occurs in the sensor's output due to engine vibrations or shocks experienced as the motorcycle travels over irregularities in the road or path surface. In several of the above embodiments, tip over is detected by determining when the lean angle exceeds a preset angle (threshold) for a predetermined period of time. However, the measured angle can be affected by vibrations during the time period which can impact the accuracy of the detection. A low pass filter, for example, an CR (capacitive-resistive) filter or the like, can be used to filter out such vibrations in order to more accurately detect tip over under such conditions. However, the use of an CR filter increases the response time period, which consequently prolongs a detection time period.

Hence, according to the present embodiment, by calculating the tangent of an output of a vertical sensor and an output of a horizontal sensor and determining tip over by the tangent output, even when the respective sensors pick up vibrations (which introduces noise into the output signal), such noise variations in the outputs of the vertical sensor and the horizontal sensor are generally canceled by each other and tip over can be determined by the preset detection angle.

With reference to step f1 of FIG. 15, a bi-directional acceleration sensor is vertically arranged with its detecting axes corresponding to the Z-axis (up and down direction) and the Y-axis (lefy and right direction). The output voltages of the acceleration sensor are detected with respect to Z-axis and Y-axis directions.

In step f2, upside-down roll over (turn over of more than ±90°) is determined by detecting the output voltage of the Z-axis direction sensor. The ECU determines whether the motorcycle has tipped by more than 90 degrees by looking at the converted signal for the Z-axis. The ECU thus determines whether the output voltage from the Z-axis sensor is less than a preset voltage that corresponds to the voltage produced when the inclination angle reaches ±90° for a preset amount of time. In the illustrated embodiment, if the measured voltage is less than the first preset voltage (which indicates a lean angle greater than ±90°) for two or more seconds, the ECU concludes that the motorcycle has rolled over and proceeds to affect various engine operations (step f4). If, however, the measured voltage is less than the preset voltage for less than 2 seconds or if the measured voltage is greater than the preset voltage, then the ECU continues to step f3 to determine whether the motorcycle has tipped over.

In step f3, the output voltage of the horizontal Y-axis sensor (FIG. 5(B)) and the output voltage of the vertical Z-axis sensor (FIG. 6(B)) are detected and the tangent (tan) =(Y-axis output voltage)÷(Z-axis output voltage) is calculated. When a tip over angle is designated by notation α, it is determined whether the tan output value is smaller than a second preset voltage (that is proportional to 1 g·tan(-α)) or is larger than a third preset voltage (that is proportional to 1 g·tan α). When either of these conditions is satisfied continuously for a preset period of time (e.g., 2 seconds or more), tip over is determined. When neither of the conditions are satisfied, the ECU returns to step f1.

With reference now to FIG. 16, the graph shows a tangent curve output provided by the sine curve output from the horizontal Y-axis sensor (FIG. 5(A)) and the cosine curve output from the vertical Z-axis sensor (FIG. 6(B)). In FIG. 16, the vehicle body angle falls in a range of from −91° to +90° because it is not determined as rolled over (step f2). It then is determined whether the tip over angle a exceeds on the left side (−side) or the right side (+side) of the vehicle body in the range.

The tip over angle α (as well as the other preset values) is set in consideration of a vehicle kind of motorcycle (e.g., scooter, street bike, cruiser, etc), a vehicle dimension, engine size (e.g., displacement) or the like. The tip over a may be made rewritable on a program in accordance with the vehicle kind or the like.

In the event that the ECU determines that the motorcycle has tipped over, the ECU stops the fuel pump, fuel injection and ignition, as represented by step f4. As noted above, however, it is preferred that the ECU gradually slow the engine by using one or more of the approaches described above.

An explanation will be given of a structure of attaching the ECU, which is integrated with the above-described tip over sensor, to the vehicle body as follows.

Figure 17:
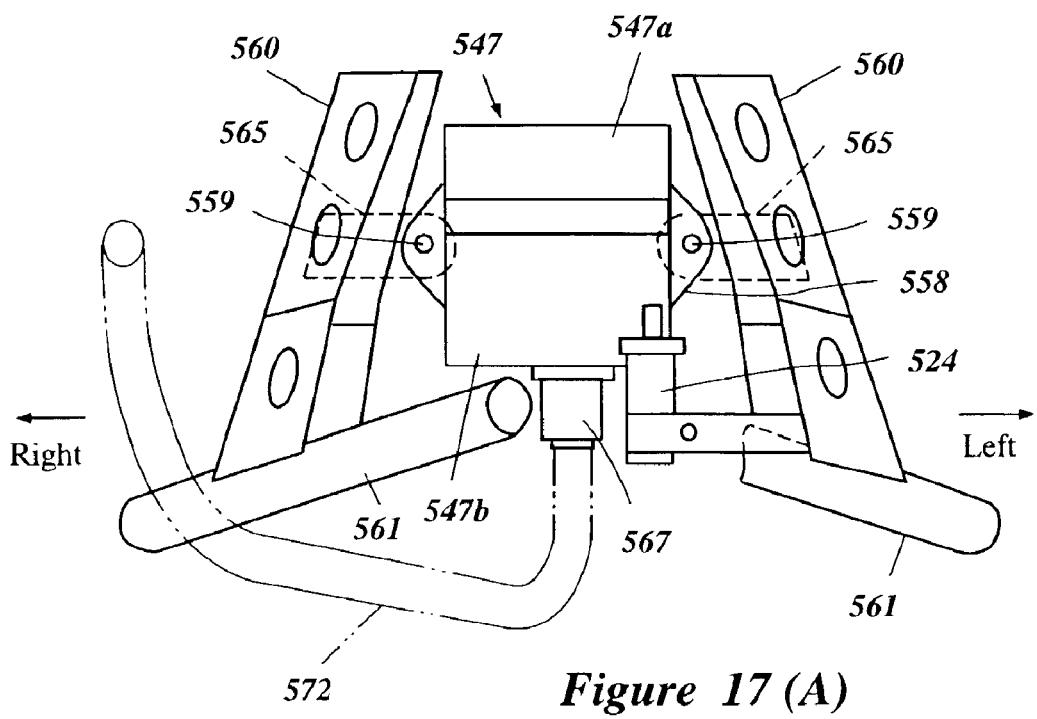
FIGS. 17(A), (B) illustrate a mount arrangement of an ECU that practices any one of the control routines.
FIG. 17(B) is a side elevational view of the motorcycle of FIG. 1 showing the mount arrangement.
Figure 17:
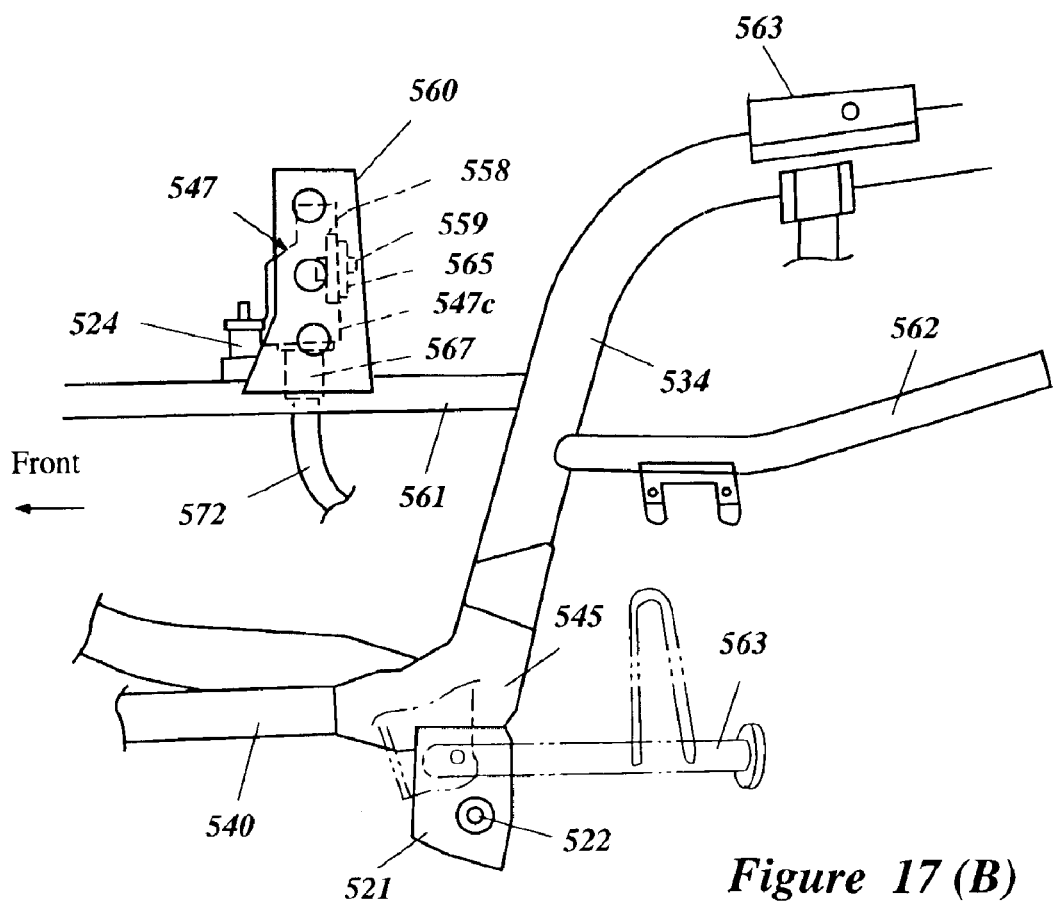

FIGS. 17(A) and 17(B) are a front side view and a left side view of a portion where the engine control unit is installed. The engine control unit (ECU) 547 in this embodiment, is substantially rectangular in shaped with a bottom part 547b protruding to the front side. The bottom part 547b is larger in thickness than a top part 547a to form a stepped shape. The ECU also has a rectangular mounting plane 547c on the rear side, and has ear parts 558 extending to the left and right sides on the same plane of the mounting plane 547c. Each of the ear parts 558 is fixed to a stay 565 welded to the inside of the bracket for supporting the fuel tank by a bolt. The wire harness is connected to the bottom of the ECU 547 via a coupler 567.

The bracket 560 is joined to the vehicle body frame member 561, which in turn is joined to each of the left and right rear vehicle body frame members 534. Each of the left and right rear vehicle body frame members 534 is joined to a front vehicle body frame member 540 via an elbow frame 545. To the elbow frame 545 is joined the above-mentioned bottom vehicle frame member 521 described above and on the bottom vehicle frame member 521 is mounted the pivot 522 for supporting the above-mentioned engine unit 519 (FIGS. 3 and 4) so that the above-mentioned engine 519 can swing. A reference numeral 562 denotes a footrest pipe frame for a tandem rider and 563 denotes a side stand.

The fuel tank (not shown) is supported by a support part (not shown) provided across the top portions of the left and right brackets 560 and the stay 563 is provided on the top of the rear vehicle body frame 534.

In the ECU 547 is received a circuit board (not shown) arranged in parallel to the mounting plane 547c and a bi-directional acceleration sensor (not shown) is mounted on the circuit board with its detection surface in parallel to the surface of the circuit board. Therefore, the tip over sensor including the bi-directional acceleration sensor is mounted with its detection surface nearly vertical to the front and rear direction of the vehicle body at a position protected by the left and right brackets 560 nearly in the center in the left and right direction of the vehicle body.

Figure 18:
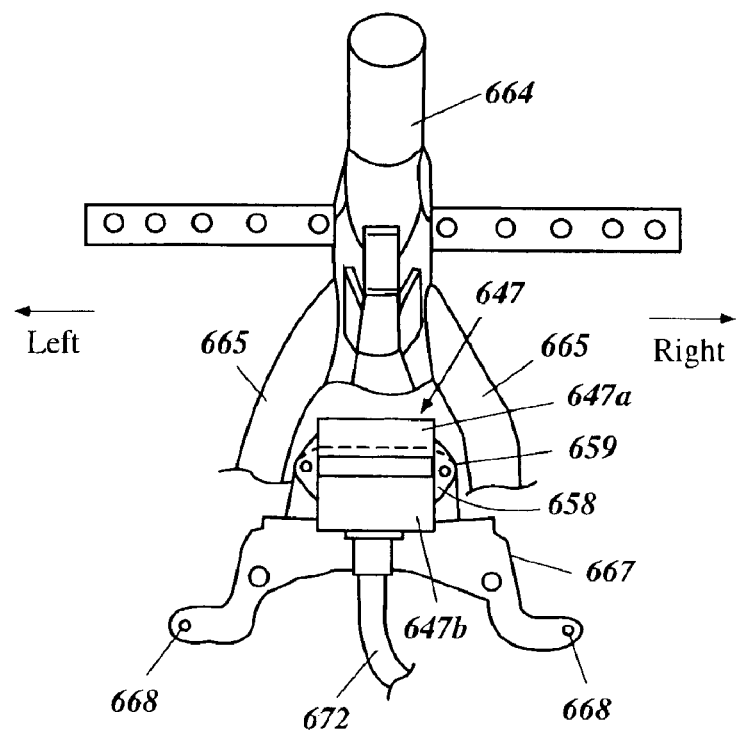
FIGS. 18(A), (B) illustrate a modified mount arrangement of the ECU.
FIG. 18(B) is a side elevational view of the motorcycle of FIG. 1 showing the modified mount arrangement of the ECU.
Figure 18:
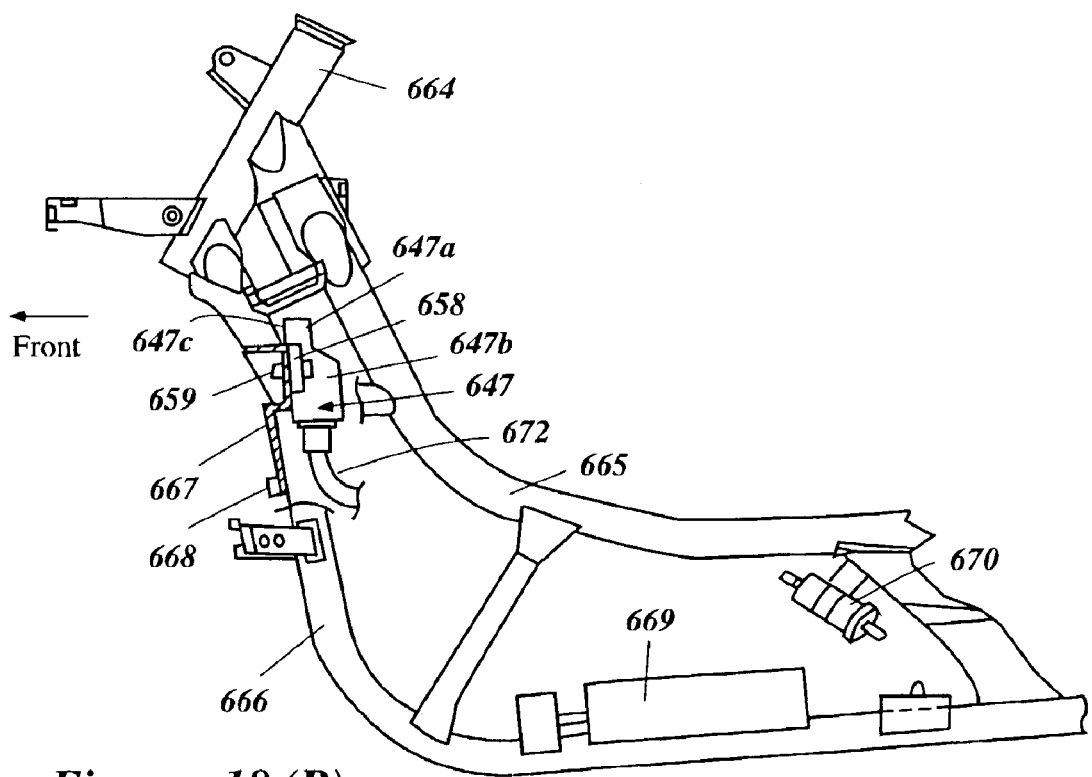

FIGS. 18(A) and 18(B) are a rear side front view and a left side view of a structure for installing an ECU in accordance with another embodiment of the present invention, respectively. In this embodiment is shown a structure in which two upper pipe frames 665 and two lower pipe frames 666 are welded to the left and right sides of the rear portion of a head pipe 664 constituting the front part of the vehicle body, respectively, and in which the ECU 647 is mounted at a position surrounded by these four pipe frames 665, 666. In the ECU 647, its ear parts 658 are fixed to a bracket 667 by bolts 659 with its mounting plane 647c faced to the front side. In the bracket 667, its forked bottom parts are fixed to the left and right lower pipe frames 666 by bolts 668. The bracket 667 further may be fixedly welded to the lower pipe frames 666 at the appropriate portions of its both side edge portions.

A reference numeral 669 denotes an electromagnetic pump for supplying fuel and 670 denotes a filter provided in the middle of a fuel hose (not shown) between the electromagnetic pump 669 and the fuel tank (not shown).

Also in this embodiment, the ECU 647 is mounted in a state where its mounting plane 647c is parallel to the detection surface of the tip over sensor (not shown) with the bi-directional accelerometer provided therein nearly vertical to the front and rear direction of the vehicle body at a position protected by the left and right pipe frames 665, 666 nearly in the center in the left and right direction of the vehicle body.

As explained above, by using an acceleration sensor as a tip over sensor and by integrating the tip over sensor inside the ECU, promotion of tip over detection accuracy and simplification of the device are achieved and the tip over sensor can be laid out efficiently in a narrow space without restricting the arrangement of other parts. Along therewith, by arranging the acceleration sensor in a vertical arrangement (that is, arrangement by which the direction of detecting the acceleration when the vehicle body is brought into the upright state, is in the direction vertical to the ground) when the vehicle body is turned over by exceeding the critical lean angle, the change in the detected output relative to the change in the inclination angle at a vicinity of the critical angle (e.g., 70°) is large and, therefore, the change in the angle within the constant A/D conversion output increment is reduced. Accordingly, conversion error can be reduced, and the accuracy and reliability of determining tip over can be increased.

Further, by using the bi-directional or the tri-directional acceleration sensor, with one axis of detection arranged in the vertical direction (first detecting direction) and with detecting the acceleration in the second detecting direction with regard to the vehicle width direction (lateral direction) or the front and rear direction (longitudinal direction), when the tip over angle is exceeded by detecting the angle in the first detecting direction, based on a detection result in the second detecting direction, the inclination of the vehicle body by wheely running or steep slope running can be prevented from being determined erroneously as tip over.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. For example, additional embodiments of a control routine for the ECU can be formed by combining various steps of the disclosed routines, as will be apparent to those skilled in the art. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A wheeled vehicle comprising a frame generally extending along a longitudinal axis, at least one front wheel coupled to the frame, at least one rear wheel coupled to the frame, a prime mover coupled to the frame and drivingly connected to at least one of the front and rear wheels, a control unit connected to the primer mover, and a sensor being coupled to the frame and communicating with the control unit, the sensor outputting a first lean signal to the control unit that varies with a leaning angle of the vehicle in a plane generally normal to the longitudinal axis, the sensor having at least one axis of detection and being arranged such that the axis of detection assumes a generally vertical central position when the vehicle stands upright, the first lean signal being generated when the axis of detection moves from its central position as the vehicle leans, the sensor includes an accelerometer configured to output a second lean signal that varies with the leaning angle of the vehicle, the accelerometer having a second detection axis that extends generally normal to the first detection axis, the second lean signal generated with the movement of the second detection axis when the vehicle leans, the control unit configured to determine whether the vehicle tips over based upon the first and second lean signals.

2. The vehicle as set forth in claim 1, wherein the control unit is configured to determine a lean angle of the vehicle relative to an upright position based at least in part on the signal from the sensor, and to ascertain when the determined lean angle equals or exceeds a preset tip over angle.

3. The vehicle as set forth in claim 2 additionally comprising a speedmeter communicating with the control unit and being adapted to output a speed signal that varies with a speed of the vehicle, the control unit preserves the lean signal as being indicative of the reference angle when the speed signal indicates that the vehicle runs faster than a preset speed, and when the lean signal varies within a preset range.

4. The vehicle as set forth in claim 1, wherein the first lean signal is indicative of a difference from a preset reference angle that is determined when the vehicle stands straight, the second lean signal is indicative of a change amount of an acceleration.

5. The vehicle as set forth in claim 1, wherein the control unit uses a numerical value that is obtained when the second lean signal is divided by the first lean signal to determine whether the vehicle tips over.

6. The vehicle as set forth in claim 1, wherein the control unit compares the lean signal to a threshold signal indicative of a lean angle of the vehicle, the threshold signal is variable based upon a mount angle of the accelerometer relative to the outer housing.

7. The vehicle as set forth in claim 1, wherein the accelerometer is placed at the control unit, the control unit is mounted on either the frame or the motive member so that the detection axis of the accelerometer moves in a plane normal to a longitudinal center axis of the vehicle that extends fore to aft when the vehicle leans.

8. The vehicle as set forth in claim 1, wherein the control unit is positioned generally on a center plane that incorporates a longitudinal center axis of the vehicle that extends fore to aft.

9. The vehicle as set forth in claim 1, wherein the control unit adapted to stop an operation of the motive member when the control unit determines that the vehicles tips over down.

10. A wheeled vehicle comprising a frame generally extending along a longitudinal axis, a front wheel attached to the frame, a rear wheel attached to the frame, a motive member mounted to the frame and connected to at least one of the front wheel and the rear wheel, a control unit electrically connected to the motive member, and an accelerometer electrically communicating with the control unit, the accelerometer adapted to output first and second lean signal that vary with a leaning angle of the vehicle, the leaning angle measured in a plane generally normal to the longitudinal axis, the control unit adapted to determine whether the vehicle tips over primarily based upon the first signal and to verify whether the first signal is truly indicative of the tip over of the vehicle based upon the second signal.

11. The vehicle as set forth in claim 10, wherein the accelerometer has first and second detection axes of the leaning angle, the first detection axis extends generally perpendicularly when the vehicle stands straight, the first lean signal is generated in relation to the first detection axis, the second detection axis extends generally normal to the first detection axis, the second lean signal is generated in relation to the second detection axis.

12. The vehicle as set forth in claim 10, wherein the first lean signal is indicative of a difference from a preset reference angle that is determined when the vehicle stands straight, the second lean signal is indicative of a change amount to an acceleration.

13. The vehicle as set forth in claim 10, wherein the control unit uses a numerical value that is obtained when the second lean signal is divided by the first lean signal to determine whether the vehicle tips over down.

14. A method for determination of a vehicle's tip over, the vehicle having a control unit and an accelerometer electrically communicating the control unit, the accelerometer having a detection axis of a leaning angle of the vehicle that extends generally perpendicularly when the vehicle stands straight, the leaning angle measured in a plane generally normal to a longitudinal axis of the vehicle, the method comprising generating a lean signal indicative of a movement of the detection axis when the vehicle leans, and determining whether the vehicle tips over based upon the lean signal.

15. The method as set forth in claim 14 additionally comprising generating a speed signal indicative of a speed of the vehicle, determining whether the vehicle runs faster than a preset speed based upon the speed signal, determining whether the lean signal varies within a preset range, and preserving the lean signal as being indicative of a reference angle of the vehicle.

16. The method as set forth in claim 14, wherein the accelerometer having a second detection axis of the leaning angle that extends generally normal to the first axis, the method additionally comprising generating a second lean signal indicative of a movement of the second detection axis when the vehicle leans, and determining whether the vehicle tips over down based upon the first and second lean signals.

17. A method for determination of a vehicle's tip over, the vehicle having a control unit and an accelerometer electrically communicating the control unit, the accelerometer having first and second detection axes of a leaning angle of the vehicle, the leaning angle measured in a plane generally normal to a longitudinal axis of the vehicle, the method comprising generating first and second lean signals indicative of movements of the first and second detection axes, respectively, when the vehicle leans, determining whether the vehicle tips over primarily based upon the first lean signal, and verifying whether the first is truly indicative of the vehicle's tip over based upon the second lean signal.

18. A wheeled vehicle comprising a frame generally extending along a longitudinal axis, at least one front wheel coupled to the frame, at least one rear wheel coupled to the frame, a prime mover coupled to the frame and drivingly connected to at least one of the front and rear wheels, a control unit connected to the prime mover, and a sensor coupled to the frame and communicating with the control unit, the sensor including at least one accelerometer and being configured to output a first lean signal to the control unit that varies with a leaning angle of the vehicle in a plane generally normal to the longitudinal axis, the sensor having at least one axis of detection and being arranged such that the axis of detection assumes a generally vertical central position when the vehicle stands upright, the first lean signal being generated when the axis of detection moves from its central position as the vehicle leans, the sensor being further configured to output a second lean signal that varies with the leaning angle of the vehicle, the sensor having a second detection axis extending generally normal to the first detection axis, the second lean signal being generated with the movement of the second detection axis when the vehicle leans, the control unit configured to determine whether the vehicle tips over based upon the first lean signal and to verify whether the first lean signal is truly indicative of the vehicle's tip over based upon the second lean signal.

* * * * *

UNITED STATES PATENT AND TRADEMARK OFFICE
CERTIFICATE OF CORRECTION

PATENT NO. : 6,941,206 B2
APPLICATION NO. : 10/278764
DATED : September 6, 2005
INVENTOR(S) : Hasegawa et al.

It is certified that error appears in the above-identified patent and that said Letters Patent is hereby corrected as shown below:

Title page,
Item [74], *Attorney, Agent, or Firm*, after "Bear" insert -- , --.

Column 14,
Line 55, after "step d3" insert -- , --.
Line 56, after "70°" insert -- or --.
Line 58, delete "regradless" and insert -- regardless --.

Column 16,
Line 24, delete "retums" and insert -- returns --.
Line 63, delete "lefy" and insert -- left --.

Column 17,
Line 40, delete "ete" and insert -- etc --.

Column 19,
Line 45, delete "primer" and insert -- prime --.

Column 20,
Line 2, delete "speedmeter" and insert -- speedometer --.
Line 45, delete "signal" and insert -- signals --.
Line 63, after "amount" delete "to" and insert -- of --.

Column 22,
Line 4, after "first" insert -- signal --.

Signed and Sealed this

Eleventh Day of July, 2006

JON W. DUDAS
*Director of the United States Patent and Trademark Office*